(12) United States Patent
Li et al.

(10) Patent No.: US 12,315,934 B2
(45) Date of Patent: May 27, 2025

(54) POSITIVE ELECTRODE PLATE, ELECTROCHEMICAL APPARATUS, AND APPARATUS

(71) Applicant: CONTEMPORARY AMPEREX TECHNOLOGY (HONG KONG) LIMITED, Hong Kong (CN)

(72) Inventors: Jing Li, Ningde (CN); Qingrui Xue, Ningde (CN); Wei Li, Ningde (CN); Zige Zhang, Ningde (CN); Yang Zhang, Ningde (CN); Xianwei Yang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 431 days.

(21) Appl. No.: 17/501,895

(22) Filed: Oct. 14, 2021

(65) Prior Publication Data

US 2022/0037667 A1 Feb. 3, 2022

Related U.S. Application Data

(63) Continuation of application No. PCT/CN2019/129354, filed on Dec. 27, 2019.

(51) Int. Cl.
*H01M 4/66* (2006.01)
*H01M 4/02* (2006.01)
*H01M 4/62* (2006.01)

(52) U.S. Cl.
CPC .......... *H01M 4/662* (2013.01); *H01M 4/623* (2013.01); *H01M 4/663* (2013.01); *H01M 4/668* (2013.01); *H01M 2004/028* (2013.01)

(58) Field of Classification Search
CPC .......... H01M 4/62; H01M 4/623; H01M 4/66; H01M 4/668; H01M 4/662; H01M 4/663
See application file for complete search history.

(56) References Cited

U.S. PATENT DOCUMENTS

| 4,492,021 A | 1/1985 | Wright |
| 5,478,676 A | 12/1995 | Turi et al. |

(Continued)

FOREIGN PATENT DOCUMENTS

| CN | 1579028 A | 2/2005 |
| CN | 1669163 A | 9/2005 |

(Continued)

OTHER PUBLICATIONS

Contemporary Amperex Technology Co., Limited, Extended European Search Report, EP19924802.2, Apr. 26, 2022, 8 pgs.

(Continued)

*Primary Examiner* — Karie O'Neill Apicella
(74) *Attorney, Agent, or Firm* — K&L Gates LLP

(57) ABSTRACT

This application relates to the battery field, and specifically, to a positive electrode plate, an electrochemical apparatus, and an apparatus. The positive electrode plate in this application includes a current collector and an electrode active material layer disposed on at least one surface of the current collector, where the current collector includes a support layer and a conductive layer disposed on at least one surface of the support layer, a single-sided thickness D2 of the conductive layer satisfies 30 nm ≤ D2 ≤ 3 μm, a thickness D1 of the support layer satisfies 1 μm ≤ D1 ≤ 30 μm, and the support layer is made of a polymer material or a polymer composite material; and the electrode active material layer includes an electrode active material, a binder, and a conductive agent, and a total thickness $D_{total}$ of the electrode active material layer is not greater than 170 μm.

20 Claims, 5 Drawing Sheets

(56) References Cited

U.S. PATENT DOCUMENTS

| | | | |
|---|---|---|---|
| 5,645,959 | A | 7/1997 | Rowlette |
| 6,022,642 | A | 2/2000 | Tsukamoto |
| 6,420,066 | B1 | 7/2002 | Frustaci |
| 8,323,831 | B2 | 12/2012 | Wilkins |
| 8,691,445 | B2 | 4/2014 | Park |
| 8,785,053 | B2 | 7/2014 | Wang |
| 9,786,904 | B2 | 10/2017 | Park |
| 2002/0160265 | A1 | 10/2002 | Hashimoto |
| 2004/0126654 | A1 | 7/2004 | Sudano |
| 2004/0126663 | A1 | 7/2004 | Sudano |
| 2004/0258997 | A1 | 12/2004 | Utsugi |
| 2005/0221190 | A1 | 10/2005 | Sudano |
| 2006/0019168 | A1 | 1/2006 | Li |
| 2006/0105243 | A1 | 5/2006 | Okamura |
| 2006/0127773 | A1 | 6/2006 | Kawakami |
| 2006/0206186 | A1* | 9/2006 | Mori ............ A61N 1/0492 607/153 |
| 2006/0263691 | A1 | 11/2006 | Park |
| 2007/0224502 | A1 | 9/2007 | Affinito |
| 2009/0305135 | A1 | 12/2009 | Shi |
| 2010/0075223 | A1 | 3/2010 | Hwang |
| 2010/0075225 | A1 | 3/2010 | Wilkins |
| 2010/0129699 | A1* | 5/2010 | Mikhaylik ........ H01M 4/1395 429/231.95 |
| 2010/0291442 | A1 | 11/2010 | Wang |
| 2011/0200884 | A1 | 8/2011 | Uchida |
| 2012/0164528 | A1 | 6/2012 | Xu et al. |
| 2012/0208082 | A1 | 8/2012 | Honda |
| 2012/0237824 | A1 | 9/2012 | Koh |
| 2013/0045413 | A1 | 2/2013 | Wang |
| 2013/0171523 | A1 | 7/2013 | Chen |
| 2014/0072873 | A1 | 3/2014 | Wang et al. |
| 2014/0154580 | A1 | 6/2014 | Park |
| 2014/0162138 | A1 | 6/2014 | Fujiki |
| 2014/0291442 | A1 | 10/2014 | Laks et al. |
| 2014/0370349 | A1 | 12/2014 | Kwon |
| 2014/0370350 | A1 | 12/2014 | Kwon |
| 2015/0221452 | A1 | 8/2015 | Iida |
| 2015/0280241 | A1 | 10/2015 | Hara |
| 2015/0303485 | A1 | 10/2015 | Kim |
| 2016/0181620 | A1 | 6/2016 | Kim |
| 2016/0211524 | A1 | 7/2016 | Hao |
| 2016/0294015 | A1* | 10/2016 | Tanaka ............ H01M 50/586 |
| 2016/0351892 | A1 | 12/2016 | Sugimori |
| 2017/0033399 | A1 | 2/2017 | Fujisawa |
| 2017/0324077 | A1 | 11/2017 | Liu |
| 2017/0338493 | A1 | 11/2017 | Shin |
| 2017/0353585 | A1 | 12/2017 | Krishnan |
| 2018/0006291 | A1 | 1/2018 | Kim |
| 2018/0069229 | A1 | 3/2018 | Ko |
| 2018/0145317 | A1 | 5/2018 | Momma et al. |
| 2018/0198132 | A1 | 7/2018 | Liang |
| 2018/0205115 | A1 | 7/2018 | Haba |
| 2018/0219212 | A1 | 8/2018 | Seol |
| 2018/0287158 | A1 | 10/2018 | Ma |
| 2018/0301709 | A1 | 10/2018 | Qiu |
| 2019/0006658 | A1 | 1/2019 | Chae |
| 2019/0173090 | A1 | 6/2019 | Liang |
| 2019/0173092 | A1 | 6/2019 | Liang |
| 2019/0245210 | A1 | 8/2019 | Matsushita |
| 2019/0393511 | A1 | 12/2019 | Zhou |
| 2020/0083527 | A1 | 3/2020 | Nakamura |
| 2020/0083542 | A1 | 3/2020 | Yushin |
| 2020/0295377 | A1 | 9/2020 | Liang |
| 2020/0388875 | A1 | 12/2020 | Kano |
| 2020/0403247 | A1 | 12/2020 | Turi |
| 2021/0066691 | A1 | 3/2021 | Asai |
| 2021/0119196 | A1 | 4/2021 | Li |
| 2021/0119218 | A1 | 4/2021 | Li |
| 2021/0119221 | A1 | 4/2021 | Li |
| 2021/0151769 | A1 | 5/2021 | Li |
| 2021/0151772 | A1 | 5/2021 | Li |
| 2021/0167397 | A1 | 6/2021 | Kim et al. |
| 2021/0210763 | A1 | 7/2021 | Li |
| 2021/0288329 | A1 | 9/2021 | Liang |
| 2021/0296654 | A1 | 9/2021 | Liang |
| 2021/0320322 | A1 | 10/2021 | Yasuda |
| 2022/0037663 | A1 | 2/2022 | Tamaki |
| 2022/0037667 | A1 | 2/2022 | Li |
| 2022/0037669 | A1 | 2/2022 | Li |
| 2022/0037670 | A1 | 2/2022 | Li |
| 2022/0037672 | A1 | 2/2022 | Xue |
| 2022/0093932 | A1 | 3/2022 | Li |

FOREIGN PATENT DOCUMENTS

| | | | |
|---|---|---|---|
| CN | 1855588 A | 11/2006 | |
| CN | 101071860 A | 11/2007 | |
| CN | 101174685 A | 5/2008 | |
| CN | 101207197 A | 6/2008 | |
| CN | 101627494 A | 1/2010 | |
| CN | 101884125 A | 11/2010 | |
| CN | 2011165388 A | 8/2011 | |
| CN | 102195032 A | 9/2011 | |
| CN | 102306800 A | 1/2012 | |
| CN | 102332558 A | 1/2012 | |
| CN | 102569816 A | 7/2012 | |
| CN | 102847859 A | 1/2013 | |
| CN | 103131267 A | 6/2013 | |
| CN | 103165863 A | 6/2013 | |
| CN | 103268942 A | 8/2013 | |
| CN | 103326029 A | 9/2013 | |
| CN | 203218375 U | 9/2013 | |
| CN | 103545530 A | 1/2014 | |
| CN | 103779569 A | 5/2014 | |
| CN | 103956499 A | 7/2014 | |
| CN | 104303344 A | 1/2015 | |
| CN | 104321907 A | 1/2015 | |
| CN | 204088469 U | 1/2015 | |
| CN | 103094619 B | 2/2015 | |
| CN | 104508896 A | 4/2015 | |
| CN | 104659368 A | 5/2015 | |
| CN | 104716328 A | 6/2015 | |
| CN | 105027347 A | 11/2015 | |
| CN | 105489845 A | 4/2016 | |
| CN | 105493323 A | 4/2016 | |
| CN | 105514349 A | 4/2016 | |
| CN | 105958118 A | 9/2016 | |
| CN | 106463698 A | 2/2017 | |
| CN | 106654285 A | 5/2017 | |
| CN | 106684319 A | 5/2017 | |
| CN | 106848324 A | 6/2017 | |
| CN | 106898729 A | 6/2017 | |
| CN | 106910897 A | 6/2017 | |
| CN | 106935901 A | 7/2017 | |
| CN | 106941149 A | 7/2017 | |
| CN | 106981665 A | 7/2017 | |
| CN | 107123812 A | 9/2017 | |
| CN | 107154499 A | 9/2017 | |
| CN | 107221676 A | 9/2017 | |
| CN | 107240721 A | 10/2017 | |
| CN | 107302094 A | 10/2017 | |
| CN | 107431186 A | 12/2017 | |
| CN | 107565137 A | 1/2018 | |
| CN | 107732146 A | 2/2018 | |
| CN | 107768677 A | 3/2018 | |
| CN | 107851836 A | 3/2018 | |
| CN | 207097950 U | 3/2018 | |
| CN | 104428928 B | 4/2018 | |
| CN | 107925056 A | 4/2018 | |
| CN | 108110220 A | 6/2018 | |
| CN | 108155363 A | 6/2018 | |
| CN | 108199005 A | 6/2018 | |
| CN | 108258249 A | 7/2018 | |
| CN | 108281662 A | 7/2018 | |
| CN | 108306013 A | 7/2018 | |
| CN | 108539252 A * | 9/2018 | ........ H01M 10/0525 |
| CN | 108598491 A | 9/2018 | |
| CN | 108666525 A | 10/2018 | |
| CN | 108682788 A | 10/2018 | |
| CN | 108832134 A | 11/2018 | |
| CN | 109004171 A | 12/2018 | |
| CN | 109103490 A | 12/2018 | |
| CN | 208298924 U | 12/2018 | |

(56) References Cited

FOREIGN PATENT DOCUMENTS

| | | | |
|---|---|---|---|
| CN | 109216675 A | 1/2019 | |
| CN | 109216703 A | 1/2019 | |
| CN | 109273668 A | 1/2019 | |
| CN | 208507818 U | 2/2019 | |
| CN | 109546154 A | 3/2019 | |
| CN | 109546204 A | 3/2019 | |
| CN | 109873160 U | 6/2019 | |
| CN | 109873161 A | 6/2019 | |
| CN | 109873163 A | 6/2019 | |
| CN | 109873164 A | 6/2019 | |
| CN | 109873166 A | 6/2019 | |
| CN | 208955108 U | 6/2019 | |
| CN | 110660957 B | 12/2020 | |
| CN | 110661001 B | 12/2020 | |
| EP | 1551070 A1 | 6/2005 | |
| EP | 2903063 A1 | 8/2015 | |
| EP | 3182487 A1 | 6/2017 | |
| EP | 3367485 A1 | 8/2018 | |
| EP | 3389122 A1 | 10/2018 | |
| EP | 3796423 A1 | 3/2021 | |
| EP | 3796436 A1 | 3/2021 | |
| JP | H1167277 A | 3/1999 | |
| JP | 2003282064 A | 10/2003 | |
| JP | 2008-258055 A | 10/2008 | |
| JP | 2010027530 A | 2/2010 | |
| JP | 2013178953 A | 9/2013 | |
| JP | 2013254692 A | 12/2013 | |
| JP | 2015115233 A | 6/2015 | |
| JP | 2017021888 A | 1/2017 | |
| JP | 2018-049825 A | 3/2018 | |
| JP | 2018073723 A | 5/2018 | |
| JP | 2018156787 A | 10/2018 | |
| JP | 2018174107 A | 11/2018 | |
| JP | 2018190656 A | 11/2018 | |
| KR | 20140137660 A | 12/2014 | |
| KR | 20180000183 A | 1/2018 | |
| WO | 2008115168 A2 | 9/2008 | |
| WO | WO 2011029058 A2 | 3/2011 | |
| WO | 2012127561 A1 | 9/2012 | |
| WO | WO-2015020338 A1 * | 2/2015 | ............ H01M 10/05 |
| WO | 2018180742 A1 | 10/2018 | |
| WO | 2019109928 A1 | 6/2019 | |

OTHER PUBLICATIONS

Contemporary Amperex Technology Co., Limited, International Search Report and Written Opinion, PCT/CN2019/129354, Mar. 26, 2020, 17 pgs.
Office Action, CN201910299937.6, Sep. 1, 2020, 12 pgs.
Office Action, CN201910299937.6, Nov. 12, 2020, 8 pgs.
The Non-Final Office Action received in the counterpart U.S. Appl. No. 17/501,902, mailed May 7, 2024.
The Non-Final Office Action received in the counterpart U.S. Appl. No. 17/059,503, mailed on Jun. 21, 2024.
The extended European Search Report received in the counterpart European Application 23220585.6, mailed on May 15, 2024.
The international search report received in the corresponding International Application PCT/CN2019/119739, mailed Jan. 14, 2020.
The written opinion of ISA received in the corresponding International Application PCT/CN2019/119739, mailed Jan. 14, 2020.
The extended European search report received in the corresponding European Application 19902406.8, mailed Aug. 5, 2021.
The first office action received in the corresponding Chinese Application 201811642323.5, mailed Jun. 3, 2020.
The non-final office action received in the corresponding U.S. Appl. No. 17/112,766, mailed Jan. 31, 2024.
The international search report received in the corresponding International Application PCT/CN2019/117142, mailed Feb. 3, 2020.
The written opinion of ISA received in the corresponding International Application PCT/CN2019/117142, mailed Feb. 3, 2020.
The first office action received in the corresponding Chinese Application 201811644245.2, mailed Jun. 9, 2020.
The extended European search report received in the corresponding European Application 19905423.0, mailed Sep. 10, 2021.
Pszczółkowski Bartosz et al: "A Comparative Analysis of Selected Methods for Determining Young's Modulus in Polylactic Acid Samples Manufactured with the FDM Method", Materials, vol. 15, No. 1, Dec. 25, 2021 (Dec. 25, 2021) , p. 149.
The first office action received in the corresponding European Application 19905423.0, mailed Feb. 6, 2023.
The final office action received in the corresponding U.S. Appl. No. 17/132,548, mailed Jun. 6, 2023.
The international search report received in the corresponding International Application PCT/CN2019/117143, mailed Mar. 11, 2020.
The written opinion of ISA received in the corresponding International Application PCT/CN2019/117143, mailed Mar. 11, 2020.
The extended European search report received in the corresponding European Application 19906208.4, mailed Sep. 10, 2021.
The first office action received in the corresponding Chinese Application 201811638645.2, mailed Jun. 16, 2020.
The third office action received in the corresponding Chinese Application 201811644244.8, mailed Jan. 12, 2021.
The extended European search report received in the corresponding European Application 19903066.9, mailed Jul. 19, 2021.
The non-final office action received in the corresponding U.S. Appl. No. 17/059,503, mailed Aug. 30, 2023.
The international search report received in the corresponding International Application PCT/CN2019/119717, mailed Jan. 23, 2020.
The written opinion of ISA received in the corresponding International Application PCT/CN2019/119717, mailed Jan. 23, 2020.
The first office action received in the corresponding Chinese Application 201811638405.2, mailed Jun. 9, 2020.
The extended European search report received in the corresponding European Application 19902246.8, mailed Nov. 29, 2021.
The first office action received in the corresponding European Application 19902246.8, mailed Jul. 1, 2022.
The non-final office action received in the corresponding U.S. Appl. No. 17/335,034, mailed Mar. 31, 2023.
The first office action received in the corresponding Chinese Application 201910580127.8, mailed Mar. 19, 2021.
The second office action received in the corresponding Chinese Application 201910580127.8, mailed Jun. 16, 2021.
The international search report received in the corresponding International Application PCT/CN2019/125061, mailed Mar. 12, 2020.
The written opinion of ISA received in the corresponding International Application PCT/CN2019/125061, mailed Mar. 12, 2020.
The first office action received in the corresponding Chinese Application 201910299179.8, mailed Sep. 2, 2020.
The second office action received in the corresponding Chinese Application 201910299179.8, mailed Dec. 9, 2020.
The international search report received in the corresponding International Application PCT/CN2019/129352, mailed Mar. 27, 2020.
The written opinion of ISA received in the corresponding International Application PCT/CN2019/129352, mailed Mar. 27, 2020.
The first office action received in the corresponding Chinese Application 201910299297.9, mailed Aug. 20, 2020.
The Notification to Grant Patent Right for Invention received in the corresponding Chinese Application 201910299297.9, mailed Nov. 27, 2020.
The international search report received in the corresponding International Application PCT/CN2019/129356, mailed Mar. 26, 2020.
The written opinion of ISA received in the corresponding International Application PCT/CN2019/129356, mailed Mar. 26, 2020.
The first office action received in the corresponding European Application 19906208.4, mailed Mar. 6, 2023.
The first office action received in the corresponding Chinese Application 201811638781.1, mailed Jun. 4, 2020.
The extended European search report received in the corresponding European Application 19905422.2, mailed Sep. 9, 2021.
The international search report received in the corresponding International Application PCT/CN2019/117141, mailed Feb. 5, 2020.
The written opinion of ISA received in the corresponding International Application PCT/CN2019/117141, mailed Feb. 5, 2020.
The first office action received in the corresponding Chinese Application 201910299473.9, mailed Aug. 18, 2020.

(56) References Cited

OTHER PUBLICATIONS

The notice of allowance received in the corresponding Chinese Application 201910299473.9, mailed Oct. 18, 2021.
The extended European search report received in the corresponding European Application 19925225.5, mailed Mar. 22, 2022.
The non-final office action received in the corresponding U.S. Appl. No. 17/501,905, mailed Sep. 14, 2023.
The international search report received in the corresponding International Application PCT/CN2019/129357, mailed Jan. 23, 2020.
The written opinion of ISA received in the corresponding International Application PCT/CN2019/129357, mailed Jan. 23, 2020.
The international search report received in the corresponding International Application PCT/CN2019/129360, mailed Apr. 1, 2020.
The written opinion of ISA received in the corresponding International Application PCT/CN2019/129360, mailed Apr. 1, 2020.
The Final Office Action received in the counterpart U.S. Appl. No. 17/501,902, mailed on Aug. 26, 2024.
The Non-Final Office Action received in the counterpart U.S. Appl. No. 17/540,263, mailed on Nov. 21, 2024.
The extended European search report received in the corresponding European Application 19933228.9, mailed Sep. 30, 2021.
The first office action received in the corresponding Chinese Application 201910586647.X, mailed Jun. 16, 2023.
The notification to grant patent right for invention eceived in the corresponding Chinese Application 201910586647.X, mailed Aug. 15, 2023.
Matweb, Material Property Data Sheet for Aluminum, 2021.
The non-final office action received in the corresponding U.S. Appl. No. 17/139,124, mailed Mar. 19, 2021.
The non-final office action received in the corresponding U.S. Appl. No. 17/139,124, mailed Aug. 10, 2022.
Matweb, Datasheet for Aluminum, 2022.
The final office action received in the corresponding U.S. Appl. No. 17/139,124, mailed Apr. 11, 2022.
The notice of allowance received in the corresponding U.S. Appl. No. 17/139,124, mailed Aug. 23, 2023.
The international search report received in the corresponding International Application PCT/CN2019/119700, mailed Feb. 19, 2020.
The written opinion of ISA received in the corresponding International Application PCT/CN2019/119700, mailed Feb. 19, 2020.
The extended European search report received in the corresponding European Application 19902910.9, mailed Jul. 8, 2021.
The first office action received in the corresponding Chinese Application 201811637655.4, mailed Jun. 16, 2020.
The third office action received in the corresponding Chinese Application 201811638645.2, mailed Sep. 18, 2021.
Eunice K Wong et al:"Battery Separator Characterization and Evaluation Procedures for NASA's Advanced Lithium-Ion Batteries", published May 1, 2010.
Pszczolkowski Bartosz et al:"A Comparative Analysis of Selected Methods for Determining Young's Modulus in Polylactic Acid Samples Manufactured with the FDM Method" Materials, vol. 15, No. 1, Dec. 25, 2021 (Dec. 25, 2021), p. 149, XP093019570, DOI: 10.3390/ma15010149.
"Temperature-Compensated Crystal Oscillator" Elektor Electronics Elektor Electronics GB vol. 25, No. 279, Jul. 1, 1999, p. 54/55.
The final office action received in the corresponding U.S. Appl. No. 17/112,749, mailed Mar. 14, 2024.
The extended European search report received in the corresponding European Application 19924692.7, mailed Mar. 21, 2022.

* cited by examiner

POSITIVE ELECTRODE PLATE, ELECTROCHEMICAL APPARATUS, AND APPARATUS

CROSS-REFERENCE TO RELATED APPLICATIONS

This application is a continuation application of PCT Patent Application No. PCT/CN2019/129354, entitled "POSITIVE POLE PIECE, ELECTROCHEMICAL DEVICE AND DEVICE" filed on Dec. 27, 2019, which claims priority to Chinese Patent Application No. 201910299937.6, filed with the State Intellectual Property Office of the People's Republic of China on Apr. 15, 2019, and entitled "POSITIVE POLE PIECE AND ELECTROCHEMICAL DEVICE", all of which are incorporated herein by reference in their entirety.

TECHNICAL FIELD

This application relates to the battery field, and specifically, to a positive electrode plate, an electrochemical apparatus, and an apparatus.

BACKGROUND

Lithium-ion batteries are widely applied to electric vehicles and consumer electronic products due to their advantages such as high energy density, high output power, long cycle life, and low environmental pollution. With continuous expansion of the application scope of the lithium-ion batteries, requirements for mass energy density and volumetric energy density of the lithium-ion batteries are increasingly high. In order to obtain a lithium-ion battery with higher mass energy density and volumetric energy density, the following improvements are usually made to the lithium-ion battery: (1) selecting a positive electrode material or a negative electrode material with a high specific discharge capacity; (2) optimizing a mechanical design of the lithium-ion battery to minimize its volume; (3) selecting a positive electrode plate or a negative electrode plate with high compacted density; and (4) reducing weight of components of the lithium-ion battery.

Among them, a current collector is typically improved by selecting a lighter or thinner current collector. For example, a perforated current collector or a plastic current collector with a metal coating layer may be used. For an electrode plate and a battery using a plastic current collector with a metal coating layer, although the energy density is increased, some performance degradations may occur in processing performance, electrochemical performance, and the like. To obtain an electrode plate and a current collector with good electrochemical performance, improvements in many aspects are still required. This application is hereby proposed to overcome disadvantages in the prior art.

SUMMARY

In view of this, this application provides a positive electrode plate, an electrochemical apparatus, and an apparatus.

According to a first aspect, this application relates to a positive electrode plate, including a current collector and an electrode active material layer disposed on at least one surface of the current collector, where the current collector includes a support layer and a conductive layer disposed on at least one surface of the support layer, a single-sided thickness D2 of the conductive layer satisfies 30 nm ≤ D2 ≤ 3 μm, a thickness D1 of the support layer satisfies 1 μm ≤ D1 ≤ 30 μm, and the support layer is made of a polymer material or a polymer composite material; and the electrode active material layer includes an electrode active material, a binder, and a conductive agent, a total thickness Dtotal of the electrode active material layer is not greater than 170 μm, and a sheet resistance of the electrode active material layer ranges from 0.1 ohm to 10 ohms.

According to a second aspect, this application relates to an electrochemical apparatus, including a positive electrode plate, a negative electrode plate, a separator, and an electrolyte, where the positive electrode plate is the positive electrode plate in the first aspect of this application.

According to a third aspect, this application relates to an apparatus, including the electrochemical apparatus in the second aspect of this application.

The technical solutions of this application have at least the following advantageous effects:

The positive electrode plate and the electrochemical apparatus (for example, a lithium-ion battery) including the positive electrode plate in this application have high energy density, good electrochemical performance, and good safety performance.

First, the positive electrode plate in this application uses a composite current collector, and therefore the energy density such as mass energy density of the electrochemical apparatus can be significantly improved.

Second, the positive electrode composite current collector in this application has a thin conductive layer (which means the metal burrs generated in abnormal cases such as nail penetration are small) and the support layer is made of a polymer material or a polymer composite material, and therefore the positive electrode plate has high internal short-circuit resistance, thereby improving nail penetration safety performance.

Third, the sheet resistance of the electrode active material layer of the positive electrode plate ranges from 0.1 ohm to 10 ohms, and therefore the positive electrode plate and the electrochemical apparatus have good electrochemical performance and good nail penetration safety performance.

In addition, the binder and/or the conductive agent contained in the electrode active material layer of the positive electrode plate according to some embodiments of this application are/is preferably unevenly distributed in the thickness direction, thereby overcoming shortcomings such as poor conductivity of the composite current collector, and damage vulnerability of the conductive layer in the composite current collector. Further, as a conductive network among the current collector, a conductive primer layer, and an active substance is effectively mended and constructed, the electron transfer efficiency is improved, and a resistance between the current collector and the electrode active material layer is reduced, thereby effectively reducing the internal direct current resistance of an electrode assembly, improving power performance of the electrode assembly, and ensuring that the electrode assembly is not prone to phenomena such as relatively great polarization and lithium precipitation during long-term cycling, meaning that effectively improving long-term reliability of the electrode assembly. In addition, an interface between the composite current collector and the electrode active material layer can be significantly improved, and a binding force between the current collector and the electrode active material layer is strengthened, thereby ensuring that the electrode active material layer is more firmly disposed on the surface of the composite current collector.

In addition, according to the electrode plate of some embodiments of this application, the electrode active material layer includes 2n+1 (n=1, 2, or 3) zones classified by compacted density, and compacted density of a middle zone is greater than compacted density of zones on two sides. Such special partition design can effectively suppress curvature and edge warping of the composite current collector and the electrode plate caused by roll-in and the like. This ensures that the electrode plate maintains good flatness after roll-in, and is advantageous in protecting the conductive layer from damage, thereby ensuring good electrochemical performance of the electrode plate.

The apparatus in this application includes the electrochemical apparatus in the second aspect of this application, and therefore has at least the same advantages as the electrochemical apparatus.

Therefore, the positive electrode plate, the electrochemical apparatus, and the apparatus in this application have good electrochemical performance, good safety performance, and good processing performance.

BRIEF DESCRIPTION OF DRAWINGS

The following describes a positive electrode plate, an electrochemical apparatus, an apparatus, and advantageous effects thereof in this application in detail with reference to the accompanying drawings and embodiments.

Figure 1:
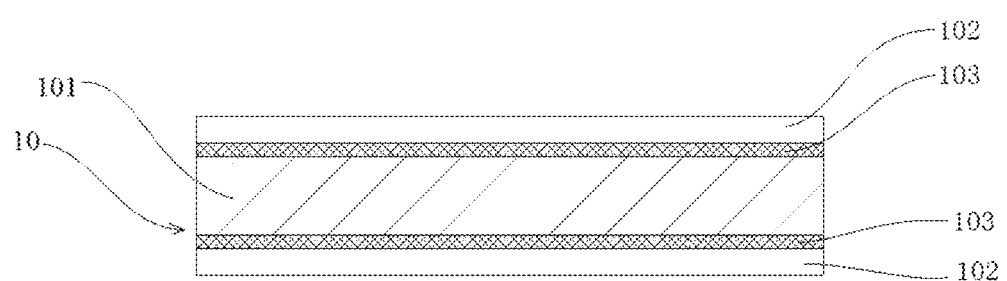
FIG. 1 is a schematic structural cross-sectional view of a positive electrode current collector according to an embodiment of this application.

In which,
PP. positive electrode plate;
  10. positive electrode current collector;
    101. positive electrode current collector support layer;
    102. positive electrode current collector conductive layer;
    103. positive electrode current collector protection layer;
  11. positive electrode active material layer;
  511. tab;
  512. clear zone;
  513. first zone with low compacted density;
  514. zone with high compacted density;
  515. second zone with low compacted density;
1. battery pack;
2. upper box body;
3. lower box body;
4. battery module; and
5. electrochemical apparatus.

DESCRIPTION OF EMBODIMENTS

The following further describes this application with reference to embodiments. It should be understood that these embodiments are merely intended to illustrate this application but not to limit the scope of this application.

A first aspect of this application relates to a positive electrode plate, including a current collector and an electrode active material layer disposed on at least one surface of the current collector, where the current collector includes a support layer and a conductive layer disposed on at least one surface of the support layer, a single-sided thickness D2 of the conductive layer satisfies 30 nm ≤ D2 ≤ 3 µm, a thickness D1 of the support layer satisfies 1 µm ≤ D1 ≤ 30 µm, and the support layer is made of a polymer material or a polymer composite material; and the electrode active material layer includes an electrode active material, a binder, and a conductive agent, a total thickness $D_{total}$ of the electrode active material layer is not greater than 170 µm, and a sheet resistance of the electrode active material layer ranges from 0.1 ohm to 10 ohms.

The current collector used for the positive electrode plate in the first aspect of this application is a composite current collector made of at least two materials. Structurally, the current collector includes a support layer and a conductive layer disposed on at least one surface of the support layer, a single-sided thickness D2 of the conductive layer satisfies 30 nm ≤ D2 ≤ 3 µm, and a thickness D1 of the support layer satisfies 1 µm ≤ D1 ≤ 30 µm. Therefore, it is the conductive layer of the current collector that serves for conducting electricity. The thickness D2 of the conductive layer is far less than a thickness of a common metal current collector such as Al foil in the prior art (the thickness of the common metal current collector: Al foil is generally 12 µm), and the support layer is made of a polymer material or a polymer composite material. Therefore, mass energy density of an electrochemical apparatus (for example, a lithium battery) using the electrode plate can be increased. In addition, when serving as a positive electrode current collector, the composite current collector can also greatly improve nail penetration safety performance of the positive electrode plate. The positive electrode current collector has the thin conductive layer, thus generating small metal burrs in an abnormal case such as nail penetration. In addition, due to the presence of the support layer, its short circuit internal resistance is large, so it is less likely to cause a short circuit.

Besides, the electrode active material layer of the positive electrode plate according to this application is specially designed, so that the positive electrode plate and an electrochemical apparatus (for example, a lithium-ion battery) including the positive electrode plate have high energy density, good electrochemical performance and good safety performance. Specifically, because the sheet resistance of the electrode active material layer is controlled within a given range, the nail penetration safety performance and electrochemical performance of the electrochemical apparatus can be further improved.

In addition, because the polymer support layer of the composite current collector has a greater rebound degree than that of a conventional metal current collector, if the current collector is coated and then compacted through a roll-in process according to a conventional process, a series of other problems arise. Due to the rebound of the support layer, edges on both sides of the electrode plate are warped upward, and as a result, the entire electrode plate has a curvature, thereby causing deformation of the electrode plate. The deformation of the electrode plate may cause separation between the electrode active material layer and the composite current collector, breakage of the conductive layer, peeling of the conductive layer from the support layer, and the like, thereby deteriorating the electrochemical performance of the electrode plate. In addition, the deformation of the electrode plate also makes the positive electrode plate and a negative electrode plate unable to accurately align. Therefore, the electrode plate prepared by using the composite current collector is prone to technical problems such as relatively great internal resistance and relatively great polarization. In the prior art, to resolve the deformation problem of the electrode plate that is caused by the composite current collector, some special technical measures usually need to be taken to release stress during an active material slurry drying process or a roll-in process, or a yield rate is inevitably compromised when a conventional process is used. In view of this, in a preferred embodiment of this application, in addition to designing of material distribution in a thickness direction of the electrode plate, material distribution in a transverse direction (that is, a direction parallel to a surface of the electrode plate) of the active material layer of the electrode plate is also specially designed. According to the preferred embodiment of this application, the electrode active material layer of the electrode plate includes 2n+1 (n=1, 2, or 3) zones distributed in a width direction (that is, a direction perpendicular to a coating direction) of the electrode plate classified by compacted density, and compacted density of a middle zone is greater than compacted density of zones on two sides. Such special partition design can effectively suppress curvature and edge warping of the composite current collector and the electrode plate caused by roll-in and the like. This ensures that the electrode plate maintains better flatness after roll-in, eliminates or reduces technical problems such as relatively great internal resistance and relatively great polarization of the electrode plate, and helps protect the conductive layer from damage, thereby ensuring good electrochemical performance of the electrode plate and the electrochemical apparatus.

According to some embodiments of this application, the binder and/or the conductive agent in the electrode active material layer are/is preferably unevenly distributed in a thickness direction.

Based on a total weight of the electrode active material layer, a weight percentage of the binder in an interior zone of the electrode active material layer closer to the current collector is greater than a weight percentage of the binder in an exterior zone of the electrode active material layer farther away from the current collector. Therefore, the interior zone with a higher binder content can significantly improve an interface between the composite current collector and the electrode active material layer, increase a binding force between the current collector and the electrode active material layer, and ensure that the electrode active material layer is more firmly disposed on a surface of the composite current collector. In addition, because the electrode active material layer can be more firmly disposed on the surface of the composite current collector, the electrode active material layer can more effectively wrap burrs generated on the conductive layer in an abnormal case such as nail penetration, and better improve nail penetration safety performance. Furthermore, an electrochemical active material in the exterior zone with a lower binder content may have a higher proportion, and therefore the positive electrode plate has better electrochemical performance (for example, electrochemical capacity and energy density).

In addition, based on the total weight of the electrode active material layer, a weight percentage of the conductive agent in the interior zone of the electrode active material layer closer to the current collector is greater than a weight percentage of the conductive agent in the exterior zone of the electrode active material layer farther away from the current collector. Therefore, the interior zone with a higher conductive agent content can serve as a conductive primer layer between the conductive layer of the current collector and the electrode active material layer, thereby better overcoming shortcomings such as poor conductivity of the composite current collector, and damage vulnerability of the conductive layer in the composite current collector. By effectively mending and constructing a conductive network among the current collector, the conductive primer layer, and the active substance, the interior zone improves electron transfer efficiency, and reduces a resistance of the electrode plate including the composite current collector, thereby effectively reducing an internal direct current resistance (DCR) of an electrode assembly, improving power performance of the electrode assembly, and ensuring that the electrode assembly is not prone to phenomena such as relatively great polarization and lithium precipitation during long-term cycling, that is, effectively improving long-term reliability of the electrode assembly. In addition, an electrochemical active material in the exterior zone with a lower conductive agent content may have a higher proportion, and therefore the positive electrode plate has better electrochemical performance (for example, electrochemical capacity and energy density).

The following describes in detail a structure, a material, performance, and the like of the positive electrode plate (and the current collector therein) in the embodiments of this application.

[Conductive Layer of the Current Collector]

Compared with a conventional metal current collector, in the current collector in an embodiment of this application, the conductive layer has a conductive function and a current collection function, and is configured to provide electrons for the electrode active material layer.

The material of the conductive layer is selected from at least one of a metal conductive material and a carbon-based conductive material.

The metal conductive material is preferably selected from at least one of aluminum, nickel, titanium, silver, and aluminum-zirconium alloy.

The carbon-based conductive material is preferably selected from at least one of graphite, acetylene black, graphene, and a carbon nanotube.

The material of the conductive layer is preferably made of a metal conductive material, that is, the conductive layer is preferably a metal conductive layer. When the current collector is a positive electrode current collector, aluminum is usually used as the material of the conductive layer.

When the conductive layer has poor conductivity or a too small thickness, the internal resistance and polarization of the battery are large; and when the conductive layer is too thick, an effect of improving mass energy density and volumetric energy density of the battery cannot be achieved.

The single-sided thickness of the conductive layer is D2. D2 preferably satisfies 30 nm $\leqslant$ D2 $\leqslant$ 3 μm, more preferably, 300 nm $\leqslant$ D2 $\leqslant$ 2 μm, and most preferably, 500 nm $\leqslant$ D2 $\leqslant$ 1.5 μm, to better ensure light weight and good conductivity of the current collector.

In a preferred embodiment of this application, an upper limit of the single-sided thickness D2 of the conductive layer may be 3 μm, 2.5 μm, 2 μm, 1.8 μm, 1.5 μm, 1.2 μm, 1 μm, and 900 nm, and a lower limit of the single-sided thickness D2 of the conductive layer may be 800 nm, 700 nm, 600 nm, 500 nm, 450 nm, 400 nm, 350 nm, 300 nm, 100 nm, 50 nm, and 30 nm. A range of the single-sided thickness D2 of the conductive layer may be defined by any one of the lower limit values and any one of the upper limit values. Preferably, 300 nm $\leqslant$ D2 $\leqslant$ 2 μm; and more preferably, 500 nm $\leqslant$ D2 $\leqslant$ 1.5 μm.

Because the thickness of the conductive layer in this application is relatively small, damages such as cracks are prone to occur in processes such as manufacturing of the electrode plate.

Generally, cracks exist in the conductive layer of the positive electrode plate in this application. The cracks in the conductive layer usually exist irregularly in the conductive layer. The cracks may be elongated cracks, cross-shaped cracks, divergent cracks, and the like, or the cracks may be cracks that penetrate the entire conductive layer, or may be formed on the surface of the conductive layer. The cracks in the conductive layer are usually caused by roll-in during the electrode plate processing, excessive amplitude during tab welding, and excessive reeling tension of a substrate.

The conductive layer may be formed on the support layer through at least one of mechanical roll-in, bonding, vapor deposition, and electroless plating. The vapor deposition method is preferably physical vapor deposition (PVD). The physical vapor deposition method is preferably at least one of an evaporating method and a sputtering method. The evaporating method is preferably at least one of vacuum evaporating, thermal evaporation deposition, and electron beam evaporation method (EBEM). The sputtering method is preferably magnetron sputtering.

Preferably, at least one of vapor deposition and electroless plating is used, so that the support layer and the conductive layer are more tightly bonded.

[Support Layer of the Current Collector]

In the current collector in an embodiment of this application, the support layer has functions of supporting and protecting the conductive layer. Since the support layer generally uses an organic polymer material or a polymer composite material, density of the support layer is usually lower than density of the conductive layer, which can significantly increase the mass energy density of the battery compared with a conventional metal current collector.

In addition, the conductive layer uses a relatively thinner metal layer, which can further increase the mass energy density of the battery. In addition, because the support layer can well support and protect the conductive layer on a surface of the support layer, a common fracture phenomenon of an electrode plate in the conventional current collector is not prone to occur.

The material of the support layer may be specifically selected from at least one of an insulation polymer material, an insulation polymer composite material, a conductive polymer material, and a conductive polymer composite material.

The insulation polymer material is, for example, selected from at least one of polyamide, polyterephthalate, polyimide, polyethylene, polypropylene, polystyrene, polyvinyl chloride, aramid, polydiformylphenylenediamine, acrylonitrile-butadiene-styrene copolymer, polybutylene terephthalate, poly(p-phenylene terephthalamide), ethylene propylene rubber, polyoxymethylene, epoxy resin, phenolic resin, polytetrafluoroethylene, polyphenyl sulfide, polyvinylidene fluoride, silicone rubber, polycarbonate, cellulose and its derivatives, starch and its derivatives, protein and its derivatives, polyvinyl alcohol and its cross-linked products, and polyethylene glycol and its cross-linked products.

The insulation polymer composite material is, for example, selected from a composite material formed of an insulation polymer material and an inorganic material, where the inorganic material is preferably at least one of a ceramic material, a glass material, and a ceramic composite material.

The conductive polymer material is, for example, selected from a polysulfur nitride polymer material or a doped conjugated polymer material, such as at least one of polypyrrole, polyacetylene, polyaniline, and polythiophene.

The conductive polymer composite material is, for example, selected from a composite material formed of an insulation polymer material and a conductive material, where the conductive material is selected from at least one of a conductive carbon material, a metal material, and a composite conductive material, the conductive carbon material is selected from at least one of carbon black, carbon nanotube, graphite, acetylene black, and graphene, the metal material is selected from at least one of nickel, iron, copper, aluminum and alloy of the foregoing metal, and the composite conductive material is selected from at least one of nickel-coated graphite powder and nickel-coated carbon fiber.

A person skilled in the art can appropriately select and determine the material of the support layer based on an actual need of the application environment, costs and other factors. In this application, the material of the support layer is preferably an insulation polymer material or an insulation polymer composite material, especially when the current collector is a positive electrode current collector.

When the current collector is a positive electrode current collector, the safety performance of the battery can be significantly improved by using a special current collector supported by an insulation layer and having a conductive layer with a specific thickness. Because the insulation layer is non-conductive, its resistance is relatively large, which can increase the short-circuit resistance when the battery is short-circuited in an abnormal case, and greatly reduce the short-circuit current. Therefore, heat generated by the short circuit can be greatly reduced, thereby improving the safety performance of the battery. In addition, the conductive layer is relatively thin, so that in an abnormal case such as nail penetration, a local conductive network is cut off, preventing a large area of the electrochemical apparatus or even the entire electrochemical apparatus from being short-circuited. This can limit the damage to the electrochemical apparatus caused by nail penetration to a penetrated site, only causing a "point break" without affecting the normal operation of the electrochemical apparatus within a period of time.

The thickness of the support layer is D1, and D1 preferably satisfies 1 μm ≤ D1 ≤ 30 μm, and more preferably, 1 μm ≤ D1 ≤ 15 μm.

If the support layer is too thin, the mechanical strength of the support layer is insufficient, and breakage may easily occur during processes such as electrode plate processing. If the support layer is too thick, the volumetric energy density of a battery using the current collector is reduced.

The upper limit of the thickness D1 of the support layer may be 30 μm, 25 μm, 20 μm, 15 μm, 12 μm, 10 μm, and 8 μm, and a lower limit may be 1 μm, 1.5 μm, 2 μm, 3 μm, 4 μm, 5 μm, 6 μm, and 7 μm; and a range of the thickness D1 of the support layer may be defined by any of the lower limit values and any of the upper limit values. Preferably, 1 μm ≤ D1 ≤ 15 μm, more preferably, 2 μm ≤ D1 ≤ 10 μm, and most preferably, 3 μm ≤ D1 ≤ 8 μm.

In addition, the specified thickness in this application can further ensure that the current collector has a relatively great resistance, and significantly reduce temperature rise of the battery when a short circuit occurs in the battery. When the conductive layer is made of aluminum, this can further significantly reduce or prevent a thermite reaction of the positive electrode current collector, and ensure good safety performance of the battery.

In addition, when the conductive layer is a metal conductive layer, a room-temperature Young's modulus of the support layer preferably satisfies 20 Gpa ≥ E ≥ 4 Gpa.

In this application, a method for testing the room-temperature Young's modulus of the support layer is as follows:

A support layer sample is taken and cut into a size of 15 mm×200 mm. A thickness h (μm) of the sample is measured with a micrometer. A Gotech tensile machine is used under room temperature and pressure to carry out a tensile test. An initial position is set, and the sample is retained 50 mm in length between clamps. Stretching is carried out at a speed of 50 mm/min. Load L (N) and displacement y (mm) of the equipment are recorded when the sample is stretched to break. In this case, stress ε=L/(15×h)×1000, and strain η=y/50×100. A stress-strain curve is drawn, and a curve in an initial linear zone is taken, where a slope of this curve is the Young's modulus E.

Since metal is more rigid than polymer or polymer composite materials, that is, the deformation is smaller during the roll-in process of the electrode plate processing, in order to ensure that a deformation difference between the support layer and the conductive layer is not too large to tear the conductive layer, the room-temperature Young's modulus of the support layer should preferably satisfy: 20 Gpa ≥ E ≥ 4 Gpa, so that the support layer can have a rigidity, and the rigidity matching between the support layer and the conductive layer can be further improved. This ensures that the difference in the deformations of the support layer and the conductive layer will not be too large during the processing of the current collector and the electrode plate.

Since the support layer has a rigidity (20 Gpa ≥ E ≥ 4 Gpa), the current collector is not easy to deform or stretch too much during the processing of the current collector and the electrode plate, so that the support layer and the conductive layer are firmly bonded and not easily separated, so as to prevent damage to the conductive layer caused by the conductive layer being "forced" to stretch. In addition, the current collector in this application has some tenacity, thereby ensuring that the current collector and the electrode plate have some capabilities to withstand deformation and are not prone to strip breakage.

However, the Young's modulus of the support layer cannot be too large; otherwise, the rigidity is too strong, which causes reeling and winding difficulties, and poor workability. When 20 Gpa ≥ E, it can be ensured that the support layer has some flexibility, and the electrode plate can also withstand deformation to some extent.

In addition, a thermal shrinkage of the support layer at 90° C. is preferably not more than 1.5%, to better ensure the thermal stability of the current collector during the processing of the electrode plate.

[Protection Layer of the Current Collector]

In some embodiments of this application, the current collector is further provided with a protection layer. The protection layer is disposed on one surface of the conductive layer of the current collector or disposed on two surfaces of the conductive layer of the current collector, that is, a surface of the conductive layer farther away from the support layer and a surface facing toward the support layer.

The protection layer may be a metal protection layer or a metal oxide protection layer. The protection layer can prevent the conductive layer of the current collector from being damaged by chemical corrosion or mechanical damage, and can also enhance the mechanical strength of the current collector.

Preferably, the protection layer is disposed on two surfaces of the conductive layer of the current collector. A lower protection layer of the conductive layer (that is, the protection layer disposed on the surface of the conductive layer facing toward the support layer) can not only prevent damage to the conductive layer and enhance the mechanical strength of the current collector, but also enhance the binding force between the support layer and the conductive layer to prevent peeling (that is, the separation of the support layer from the conductive layer).

The technical effect of an upper protection layer of the conductive layer (that is, the protection layer disposed on the surface of the conductive layer farther away from the support layer) is mainly to prevent the conductive layer from being damaged, corroded, and the like during processing (for example, both electrolyte infiltration and roll-in affect the surfaces of the conductive layer).

In virtue of the good conductivity, the metal protection layer can not only further improve the mechanical strength and corrosion resistance of the conductive layer, but also reduce the polarization of the electrode plate. The material of the metal protection layer is, for example, selected from at least one of nickel, chromium, a nickel-based alloy, or a copper-based alloy, and preferably, nickel and a nickel-based alloy.

The nickel-based alloy is an alloy formed by adding one or more other elements to pure nickel as the matrix. Preferably, it is a nickel-chromium alloy. The nickel-chromium alloy is an alloy formed of metallic nickel and metallic chromium. Optionally, the molar ratio of nickel to chromium is 1:99 to 99:1.

The cooper-based alloy is an alloy formed by adding one or more other elements to a pure cooper matrix. Preferably, it is a copper-nickel alloy. Optionally, in the copper-nickel alloy, a molar ratio of nickel to copper is 1:99 to 99:1.

When a metal oxide is selected for the protection layer, due to its low ductility, large specific surface area, and high hardness, it can also effectively support and protect the conductive layer, and have a good technical effect on improving the binding force between the support layer and the conductive layer. The material of the metal oxide protection layer is, for example, selected from at least one of aluminum oxide, cobalt oxide, chromium oxide, and nickel oxide.

The composite current collector according to this application preferably uses a metal oxide as a material of its protection layer to further improve safety performance of the positive electrode plate and battery while achieving a good technical effect of support and protection.

The thickness of the protection layer is D3, and D3 preferably satisfies D3 ≤ D2/10, and 1 nm ≤ D3 ≤ 200 nm. If the protection layer is too thin, it is not enough to protect the conductive layer; and if the protection layer is too thick, the mass energy density and the volumetric energy density of the battery are reduced. More preferably, 5 nm ≤ D3 ≤ 500 nm, even more preferably, 10 nm ≤ D3 ≤ 200 nm, and most preferably, 10 nm ≤ D3 ≤ 50 nm.

The materials of the protection layers on the two surfaces of the conductive layer may be the same or different, and the thicknesses of the protection layers may be the same or different.

Preferably, the thickness of the lower protection layer is less than the thickness of the upper protection layer to help improve the mass energy density of the battery.

Further optionally, the ratio of the thickness D3" of the lower protection layer to the thickness D3' of the upper protection layer is: ½ D3' ≤ D3" ≤ ⅘ D3'.

When the current collector is a positive electrode current collector, aluminum is usually used as the material of the conductive layer, and a metal oxide material is preferably selected for the lower protection layer. Compared with the choice of metal used for the lower protection layer, the metal oxide material has larger resistance. Therefore, this type of lower protection layer can further increase the resistance of the positive electrode current collector to some extent, thereby further increasing the short circuit resistance of the battery in the event of a short circuit in an abnormal case, and improving the safety performance of the battery. In addition, because the specific surface area of the metal oxide is larger, the binding force between the lower protection layer of the metal oxide material and the support layer is enhanced. Moreover, because the specific surface area of the metal oxide is larger, the lower protection layer can increase the roughness of the support layer surface, and enhance the binding force between the conductive layer and the support layer, thereby increasing the overall strength of the current collector. Therefore, when the current collector is a positive electrode current collector, the lower protection layer is preferably made of a metal oxide material, and the upper protection layer is made of a metal material or a metal oxide material. The upper protection layer is preferably also made of a metal oxide material.

[Current Collector]

FIG. 1 to FIG. 4 are schematic structural diagrams of a current collector used in a positive electrode plate according to some embodiments of this application.

In FIG. 1, a positive electrode current collector 10 includes a positive electrode current collector support layer 101 and positive electrode current collector conductive layers 102 that are disposed on two opposite surfaces of the positive electrode current collector support layer 101, and further includes positive electrode current collector protection layers 103 that are disposed on lower surfaces of the positive electrode current collector conductive layers 102 (that is, surfaces facing toward the positive electrode current collector support layer 101), that is, lower protection layers.

Figure 2:
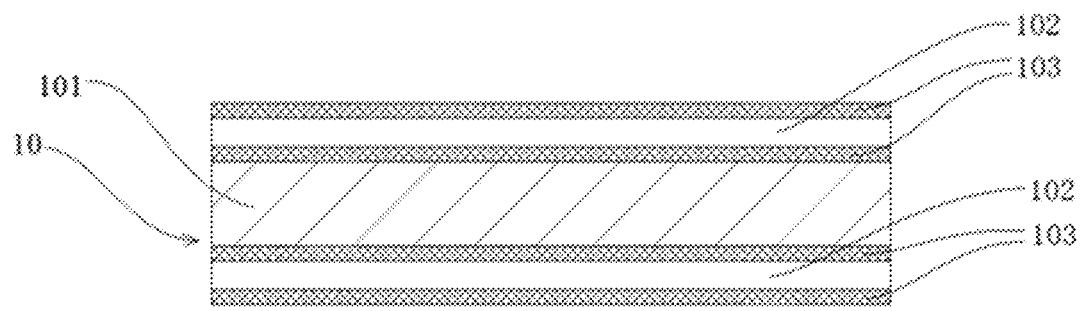
FIG. 2 is a schematic structural cross-sectional view of a positive electrode current collector according to another embodiment of this application.

In FIG. 2, a positive electrode current collector 10 includes a positive electrode current collector support layer 101 and positive electrode current collector conductive layers 102 that are disposed on two opposite surfaces of the positive electrode current collector support layer 101, and further includes positive electrode current collector protection layers 103 that are disposed on two opposite surfaces of the positive electrode current collector conductive layer 102, that is, a lower protection layer and an upper protection layer.

Figure 3:
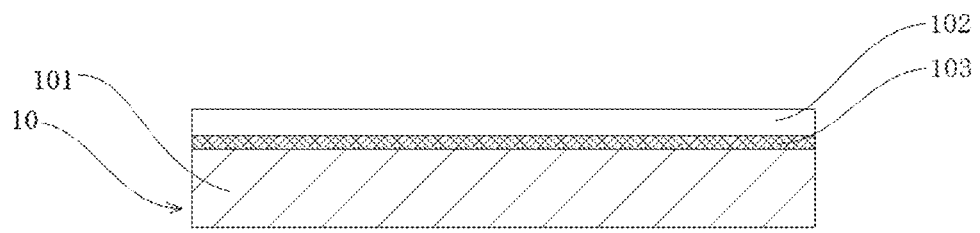
FIG. 3 is a schematic structural cross-sectional view of a positive electrode current collector according to another embodiment of this application.

In FIG. 3, a positive electrode current collector 10 includes a positive electrode current collector support layer 101 and a positive electrode current collector conductive layer 102 that is disposed on one surface of the positive electrode current collector support layer 101, and further includes a protection layer 103 of the positive electrode current collector that is disposed on a surface of the positive electrode current collector conductive layer 102 facing toward the positive electrode current collector support layer 101, that is, a lower protection layer.

Figure 4:
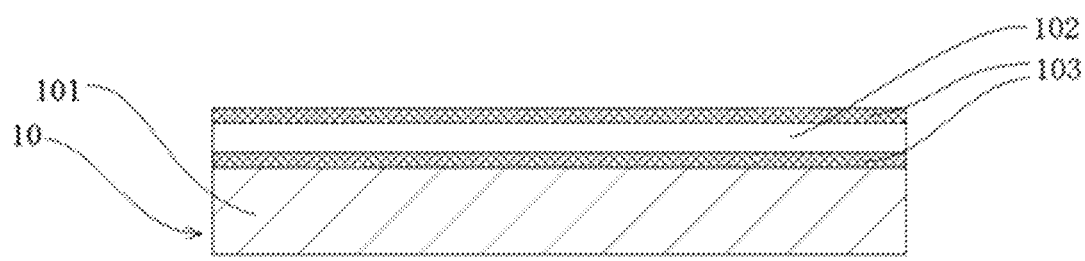
FIG. 4 is a schematic structural cross-sectional view of a positive electrode current collector according to another embodiment of this application.

In FIG. 4, a positive electrode current collector 10 includes a positive electrode current collector support layer 101 and a positive electrode current collector conductive layer 102 that is disposed on one surface of the positive electrode current collector support layer 101, and further includes positive electrode current collector protection layers 103 that are disposed on two opposite surfaces of the positive electrode current collector conductive layer 102, that is, a lower protection layer and an upper protection layer.

The materials of the protection layers on the two opposite surfaces of the conductive layer may be the same or different, and the thicknesses of the protection layers may be the same or different.

For the current collectors used for the positive electrode plate according to this application, a conductive layer may be separately disposed on two opposite surfaces of the support layer, as shown in FIG. 1 and FIG. 2; or a conductive layer may be disposed on only one surface of the support layer, as shown in FIG. 3 and FIG. 4.

Although the composite current collector used for the positive electrode plate in this application preferably includes the protection layer of the current collector shown in FIG. 1 to FIG. 4, it should be understood that the protection layer of the current collector is not a necessary structure of the current collector. In some embodiments, the used current collector may not include the protection layer of the current collector.

[Electrode Active Material Layer of Positive Electrode Plate]

The electrode active material layer used for the positive electrode plate in this application generally includes an electrode active material, a binder, and a conductive agent. The electrode active material layer may further include other optional additives or auxiliaries as needed.

For the positive electrode plate in this application, an average particle size D50 of the active material in the electrode active material layer is preferably 5 μm to 15 μm. If D50 is excessively small, porosity of the electrode plate after compaction is relatively small, which is not conducive to the infiltration by the electrolyte, and its relatively large specific surface area is likely to cause more side reactions with the electrolyte, reducing the reliability of the electrode assembly; or if D50 is excessively large, a great damage is likely to be caused to the composite current collector during the compaction process of the electrode plate. D50 is a corresponding particle size when a cumulative volume percentage of the active material reaches 50%, that is, a median particle size in volume distribution. For example, D50 may be measured by using a laser diffraction particle size distribution measuring instrument (for example, Malvern Mastersizer 3000).

For the positive electrode plate in this application, various electrode active materials commonly used in the art (that is, positive electrode active materials) may be selected. For example, for lithium batteries, the positive electrode active material may be selected from lithium cobalt oxide, lithium nickel oxide, lithium manganese oxide, lithium nickel manganese oxide, lithium nickel cobalt manganese oxide, lithium nickel cobalt aluminum oxide, transition metal phosphate, lithium iron phosphate, and the like. However, this application is not limited to these materials, and may further use other conventional well-known materials that can be used as positive electrode active substances of the lithium-ion battery. One type of these positive electrode active materials may be used alone, or two or more types may be used in combination. Preferably, the positive electrode active material may be selected from one or more of $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$, and $LiMnPO_4$.

An important feature of the positive electrode plate in this application is that a total thickness $D_{total}$ of the electrode active material layer is not greater than 170 μm, that is, $D_{total} \leq 170$ μm. In this application, for a technical solution of single-sided coating of the electrode active material layer, the total thickness $D_{total}$ of the electrode active material layer is a single-sided thickness D4 of the electrode active material layer; and for a technical solution of double-sided coating of the electrode active material layer, the total thickness $D_{total}$ of the electrode active material layer is twice the single-sided thickness D4 of the electrode active material layer, that is, 2D4. In addition, if coating is performed with electrode active material layers in a multi-layered coating method, for calculation of D4 and $D_{total}$, all electrode active material layers (namely, all layers) need to be counted. If $D_{total} > 170$ μm, the kinetic performance of the battery is poor.

In the case of $D_{total} \leq 170$ μm, another important feature of the positive electrode plate in this application is that the sheet resistance of the electrode active material layer of the positive electrode plate ranges from 0.1 ohm to 10 ohms. The applicant of this application finds that when the sheet resistance falls within a proper range, the nail penetration safety performance of the battery can be further ensured, and the good electrochemical performance of the battery can be ensured. If the sheet resistance is too small, it is not enough to ensure the nail penetration safety; and if the sheet resistance is too large, the electrochemical performance is poor. Intrinsic resistivity of the active material, the conductive agent content, the binder content, a particle size of the active material, an electrolyte conductivity, compacted density (higher compacted density means larger resistance), the thickness of the active material layer, and the like all affect the sheet resistance of the active material layer. Therefore, the sheet resistance of the active material layer may be adjusted by adjusting or controlling these parameters.

Figure 8:
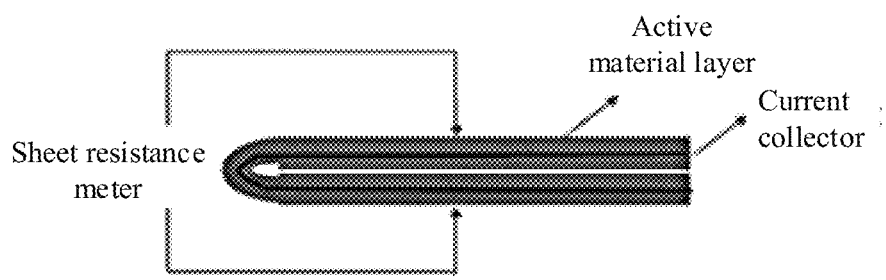
FIG. 8 is a schematic diagram of measuring a sheet resistance of an electrode active material layer according to this application.

The sheet resistance of the electrode active material layer in this application may be tested, for example, in the following method:

In an environment of 5% humidity and room temperature, a 100 mm×100 mm electrode plate soaked in an lithium-ion battery electrolyte is taken and folded in half (an electrode plate with two surfaces coated with the positive electrode active material layer is used as an example herein, while for an electrode plate with one surface coated with the positive electrode active material layer, the positive electrode active material layer is folded outward in half), and then placed directly between probes of a sheet resistance meter (as shown in FIG. 8) for testing, to obtain the sheet resistance of the active material layer of the tested electrode plate. Five electrode plate samples were tested to obtain an average value as the sheet resistance of the active material layer.

When the electrode active material layer has a total thickness not greater than 170 μm and a sheet resistance ranging from 0.1 ohm to 10 ohms, the positive electrode plate (and the electrochemical apparatus) in this application can have good electrochemical performance and good nail penetration safety performance. Especially when the sheet resistance ranges from 0.6 ohm to 0.9 ohm, it can be further ensured that the electrode plate has good nail penetration safety performance and also has good electrochemical performance.

According to some embodiments of this application, based on the total weight of the electrode active material layer, the binder content of the electrode active material layer is not less than 1 wt %, preferably, not less than 1.5 wt %, and more preferably, not less than 2 wt %. For the positive electrode plate in this application, when the binder content of the electrode active material layer is relatively high, the binding force between the active material layer and the composite current collector can be strengthened, to suppress deterioration of the binding force between the composite current collector and the electrode active material layer that is caused by relatively great rebound of the support layer during processing, so that in an abnormal case such as nail penetration, the active material layer can effectively wrap metal burrs generated on the conductive layer, so as to improve the nail penetration safety performance of the battery. When the binder content is maintained within such range, the binding force between the active material layer and the current collector is strong, and as a result, in an abnormal case such as nail penetration, the active material layer can more effectively wrap the metal burrs generated in the conductive layer to improve the nail penetration safety performance of the battery.

However, when the binder content of the electrode active material layer is increased, the proportion of the active material decreases. This is not conducive to obtaining an electrode plate and electrochemical apparatus with a high electrochemical capacity and high energy density. Therefore, in a case that the sheet resistance of the electrode active material layer falls within 0.1 ohm to 10 ohms, according to some embodiments of this application, the binder and/or the conductive agent contained in the electrode active material layer are/is preferably unevenly distributed in a thickness direction.

The conductive agent used in the electrode active material layer is preferably at least one of a conductive carbon material and a metal material.

For example, the conductive carbon material is selected from at least one of zero-dimensional conductive carbon (for example, acetylene black or conductive carbon black), one-dimensional conductive carbon (for example, carbon nanotube), two-dimensional conductive carbon (for example, conductive graphite or graphene), and three-dimensional conductive carbon (for example, reduced graphene oxide); and the metal material is selected from at least one of aluminum powder, iron powder, and silver powder.

It is known to a person skilled in the art that a needed electrode active material layer is obtained by applying a slurry made of an electrode active material, a conductive agent, and a binder onto an electrode current collector, and then performing post-processing such as drying.

Similar to the conventional positive electrode plate, for the positive electrode plate in this application, the coating zone of the entire electrode plate surface can be evenly coated with the electrode active material layer, and then a cold pressing (roll-in) operation is performed on the entire electrode plate surface. Compacted density of the electrode active material layer on the obtained electrode plate is basically uniform without significant difference. As mentioned above, due to particularity of the composite current collector, this coating method may cause an edge of the electrode plate to warp up and the entire electrode plate to curve during the roll-in process, thereby reducing a yield rate of the electrode plate. Therefore, in some embodiments of this application, viewed in a width direction of the coated surface of the positive electrode plate, classified by compacted density, the electrode active material layer for coating includes 2n+1 (n=1, 2, or 3) zones, and compacted density of a middle zone is greater than compacted density of zones on both sides. Because compacted density of the zones on both sides of the electrode plate is low after the process such as the cold pressing (roll-in), and compacted density of the middle zone is high, that is, pressure on the zones on the both sides of the electrode plate is lower than that on the middle zone in the process such as the cold pressing (roll-in), edge warping and curvature of the composite current collector and the electrode plate that are caused by the rebound of the composite current collector during the electrode plate processing may be prevented, which is conducive to formation of the electrode plate with a flat surface, thereby helping to ensure electrochemical performance of the electrochemical apparatus.

In this application, the "length direction" and "width direction" of the surface of the electrode plate respectively refer to two dimensions of the surface. The length direction is a main dimension direction (that is, a direction with a larger magnitude), and the width direction is a secondary dimension direction (that is, a direction with a smaller magnitude). Generally, the length direction is consistent with a coating direction of each material layer (for example, the electrode active material layer) during the electrode plate processing, and is also consistent with a winding direction of the electrode plate during a manufacturing process of the electrochemical apparatus (for example, the battery); and the width direction is perpendicular to the length direction.

"The compacted density of the middle zone being higher than the compacted density of the zones on the two sides" means that the compacted density of the middle zone is the highest, and the compacted density of the zones on the two sides gradually decreases from the middle to the edge. Preferably, symmetrical zones on both sides have identical compacted density.

To form the 2n+1 zones of the active material layer based on the compacted density according to this application, a partition coating method may be used. That is, the surface of the electrode plate is divided into different zones (or boundaries) by using baffle plates or spacers. Each zone is coated with an electrode active material slurry of different weight. In this way, after roll-in, zones of the active material layer that have different compacted density are formed. In addition, zones on both sides preferably symmetrically have identical compacted density. Such design helps to better ensure flatness of the electrode plate.

In consideration of process complexity and a cost issue, the electrode active material layer for coating preferably includes 3 (n=1) or 5 (n=2) zones, and most preferably 3 zones based on the compacted density.

According to some embodiments of this application, the conductive agent in the electrode active material layer is unevenly distributed in the thickness direction, that is, the weight percentage of the conductive agent in the electrode active material layer is uneven and varying. More specifically, based on the total weight of the electrode active material layer, a weight percentage of the conductive agent in the interior zone (also referred to as a "lower electrode active material layer") of the electrode active material layer is greater than a weight percentage of the conductive agent in the exterior zone (also referred to as an "upper electrode active material layer") of the electrode active material layer. Preferably, a weight percentage of an electrochemical active material in the interior zone is lower than a weight percentage of an electrochemical active material in the exterior zone.

In this application, the "interior" of the electrode active material refers to a side of the electrode active material layer closer to the current collector in the thickness direction, and the "exterior" of the electrode active material refers to a side of the electrode active material layer farther away from the current collector in the thickness direction.

"The conductive agent is unevenly distributed in the thickness direction" and "a weight percentage of the conductive agent in the interior zone of the electrode active material layer is greater than a weight percentage of the conductive agent in the exterior zone of the electrode active material layer" may be implemented in multiple ways. For example, the weight percentage of the conductive agent in the electrode active material layer may gradually decrease along the thickness direction from the interior zone to the exterior zone; or the electrode active material layer is divided into two or more zones (divided into two layers, three layers, or more layers) in the thickness direction, and the weight percentage of the conductive agent in a zone closest to the current collector is higher than the weight percentage of the conductive agent in each zone farther away from the current collector. In an embodiment of this application, the electrode active material layer is divided into two zones (that is, divided into two electrode active material layers) in the thickness direction, and weight percentage of the conductive agent in a lower-layer (interior) electrode active material is higher than the weight percentage of the conductive agent in an upper-layer (exterior) electrode active material.

In a preferred embodiment of this application, the electrode active material layer is divided into two zones in the thickness direction, that is, the interior zone and the exterior zone, and based on a total weight of the electrode active material layer in the interior zone, a weight percentage of the conductive agent in the interior zone is 10 wt % to 99 wt %, preferably, 20 wt % to 80 wt %, and more preferably, 50 wt % to 80 wt %. Based on the total weight of the electrode active material layer in the exterior zone, a weight percentage of the conductive agent in the exterior zone is preferably 0.5 wt % to 10 wt %.

Therefore, the interior zone with a higher conductive agent content can serve as a conductive primer layer between the conductive layer of the current collector and the electrode active material layer, thereby better overcoming shortcomings such as poor conductivity of the composite current collector, and damage vulnerability of the conductive layer in the composite current collector. By effectively mending and constructing a conductive network among the current collector, the conductive primer layer, and the active substance, the interior zone improves electron transfer efficiency, and reduces the resistance of the electrode plate including the composite current collector, thereby effectively reducing an internal direct current resistance (DCR) of an electrode assembly, improving power performance of the electrode assembly, and ensuring that the electrode assembly is not prone to phenomena such as relatively great polarization and lithium precipitation during long-term cycling, that is, effectively improving long-term reliability of the electrode assembly. In addition, an electrochemical active material in the exterior zone with a lower conductive agent content may have a higher proportion, and therefore the positive electrode plate has better electrochemical performance (for example, electrochemical capacity and energy density).

Preferably, the conductive agent in the interior zone includes a one-dimensional conductive carbon material (for example, a carbon nanotube) or a two-dimensional conductive carbon material. After the two-dimensional conductive carbon material is added, the two-dimensional conductive carbon material in the interior zone of the electrode active material layer can come into "horizontal sliding" during the compaction of the electrode plate, achieving a function of buffering, reducing the damage to the conductive layer of the current collector during the compaction, and reducing cracks. Preferably, a particle size D50 of the two-dimensional conductive carbon material is 0.01 µm to 0.1 µm. In addition, due to the special morphology of the one-dimensional conductive carbon material, the conductivity of the interior zone can be improved after addition. Especially when a specified amount of conductive agents is added, compared with other types of conductive materials, the one-dimensional conductive carbon material can better improve the conductivity of the interior zone. The one-dimensional conductive carbon material is preferably a carbon nanotube, and an aspect ratio of the carbon nanotube is preferably 1000 to 5000.

Preferably, the one-dimensional conductive carbon material or two-dimensional conductive carbon material in the interior zone accounts for 1 wt % to 50 wt % of the conductive agent in the interior zone, and the remaining conductive agent may be another type of conductive agent and is preferably a zero-dimensional carbon material. The one-dimensional conductive carbon material and/or the two-dimensional conductive carbon material and the zero-dimensional carbon material may work together to better improve the conductive performance of the interior zone and better serve as a conductive primer layer. The conductive agent in the interior zone is preferably a mixed material of conductive carbon black and a carbon nanotube.

Certainly, to better implement the buffer function, the conductive agent in the exterior zone also preferably includes a two-dimensional conductive carbon material, or to better implement the conducting function, the conductive agent in the exterior zone also preferably includes a one-dimensional conductive carbon material (for example, a carbon nanotube).

Preferably, the conductive agent in both the interior zone and the exterior zone includes a carbon nanotube, and more preferably, the conductive agent in both the interior zone and the exterior zone is a mixture of a carbon nanotube and conductive carbon black.

Because the conductive agent is unevenly distributed, the binder content and the active material content in the electrode active material may also change along the thickness direction.

For example, the binder used in the electrode active material layer may be selected from at least one of styrene butadiene rubber, oily polyvinylidene fluoride (PVDF), polyvinylidene fluoride copolymer (for example, PVDF-HFP copolymer or PVDF-TFE copolymer), sodium carboxy methyl cellulose, polystyrene, polyacrylic acid, polytetrafluoroethylene, polyacrylonitrile, polyimide, aqueous PVDF, polyurethane, polyvinyl alcohol, polyacrylate, polyacrylic acid-polyacrylonitrile copolymer, and polyacrylate-polyacrylonitrile copolymer.

The binder in the interior zone is preferably an aqueous binder, for example, at least one of aqueous PVDF, acrylic acid, polyurethane, polyvinyl alcohol, polyacrylate, polyacrylic acid-polyacrylonitrile copolymer, and polyacrylate-polyacrylonitrile copolymer. In this way, DCR of the electrochemical apparatus does not increase significantly. In this application, an "aqueous" polymer material means that the polymer molecular chain is fully extended and dispersed in water, and an "oily" polymer material means that the polymer molecular chain is fully extended and dispersed in an oily solvent. Those skilled in the art understand that the same type of polymer material can be dispersed in water and oil respectively by using suitable surfactants, that is, by using suitable surfactants, the same type of polymer material can be made into an aqueous polymer material and an oily polymer material. For example, a person skilled in the art can replace PVDF with aqueous PVDF or oily PVDF as needed.

In addition, for the positive electrode plate in this application, when the binder content of the electrode active material layer is high, there is an appropriate binding force between the active material layer and the current collector. Therefore, in an abnormal case such as nail penetration, the active material layer can effectively wrap metal burrs generated in the conductive layer, to improve the nail penetration safety performance of the battery. However, if the binder content is excessively high, the active material content is reduced, and this is disadvantageous for ensuring a high electrochemical capacity of the battery. Therefore, in terms of further improving battery safety and ensuring a high battery capacity, the binder in the electrode active material layer is preferably unevenly distributed in a thickness direction, where based on a total weight of the electrode active material layer, a weight percentage of the binder in an interior zone of the electrode active material layer closer to the current collector is greater than a weight percentage of the binder in an exterior zone of the electrode active material layer farther away from the current collector.

In a preferred embodiment of this application, the electrode active material layer is divided into two zones in the thickness direction, that is, the interior zone and the exterior zone, and based on a total weight of the electrode active material layer in the interior zone, a weight percentage of the binder in the interior zone is 1 wt % to 90 wt %, preferably, 20 wt % to 80 wt %, and more preferably, 20 wt % to 50 wt %. Based on a total weight of the exterior zone of the electrode active material layer, a weight percentage of the binder in the exterior zone is preferably 1 wt % to 5 wt %.

Therefore, the interior zone with a higher binder content can significantly improve an interface between the composite current collector and the electrode active material layer, increase a binding force between the current collector and the electrode active material layer, and ensure that the electrode active material layer is more firmly disposed on a surface of the composite current collector. In addition, because the electrode active material layer can be more firmly disposed on the surface of the composite current collector, the interior zone with a higher binder content can serve as an adhesive layer in an abnormal case such as nail penetration, so that the electrode active material layer can more effectively wrap burrs generated on the conductive layer, and better improve nail penetration safety performance. Furthermore, an electrochemical active material in the exterior zone with a lower binder content may have a higher proportion, and therefore the positive electrode plate has better electrochemical performance (for example, electrochemical capacity and energy density).

In a preferred embodiment of this application, the electrode active material layer is divided into two zones in the thickness direction, that is, the interior zone and the exterior zone, and based on the total weight of the electrode active material layer in the interior zone, the weight percentage of the conductive agent in the interior zone is 10 wt % to 99 wt %, preferably, 20 wt % to 80 wt %, and more preferably, 50 wt % to 80 wt %; the weight percentage of the binder in the interior zone is 1% to 90%, preferably, 20% to 80%, and more preferably, 20% to 50%; and the rest is the electrode active material. However, in this embodiment, the electrode active material content in the interior zone may be 0%.

In another preferred embodiment of this application, based on the total weight of the electrode (positive electrode) active material layer in the interior zone, the conductive agent content is preferably 10 wt % to 98 wt %, the binder content is preferably 1 wt % to 89 wt %, and the electrode (positive electrode) active material content is preferably 1 wt % to 89 wt %.

To further improve nail penetration safety of the battery, the binder content in the exterior zone of the electrode active material layer (relative to the total weight of the electrode active material layer in the exterior zone) is preferably not less than 1 wt %, preferably, not less than 1.5 wt %, and most preferably, not less than 2 wt %. If a given binder content in the exterior zone is maintained, the binding force between the interior zone and the exterior zone of the active material layer is relatively strong. Therefore, in an abnormal case such as nail penetration, the entire active material layer can effectively wrap metal burrs generated in the conductive layer, thereby improving nail penetration safety performance of the battery.

It should be noted that in the embodiment in which the electrode active material layer is divided into two zones in the thickness direction, that is, the interior zone and the exterior zone, electrode active materials, conductive agents, and binders used in the interior zone and the exterior zone may be the same or different. A conductive agent preferably including a one-dimensional conductive carbon material and/or a two-dimensional conductive carbon material in this application and an aqueous binder are preferably used in the interior zone. A same or different conductive agent and binder may be used in the exterior zone. For the positive electrode plate in this embodiment, the positive electrode active material in the interior zone may be the same as or different from the positive electrode active material in the exterior zone; and the positive electrode active material in the interior zone is preferably a material with high thermal stability, for example, at least one of lithium iron phosphate, lithium manganese iron phosphate, lithium manganate, lithium manganese phosphate, NCM333, and NCM523.

The electrode active material layer in which the conductive agent/binder is unevenly distributed in the thickness direction may be prepared by using a known method in the art, for example, by using a multi-layer coating method, for example, a double coating method or a triple coating method. However, this application is not limited thereto.

[Positive Electrode Plate]

Figure 5:
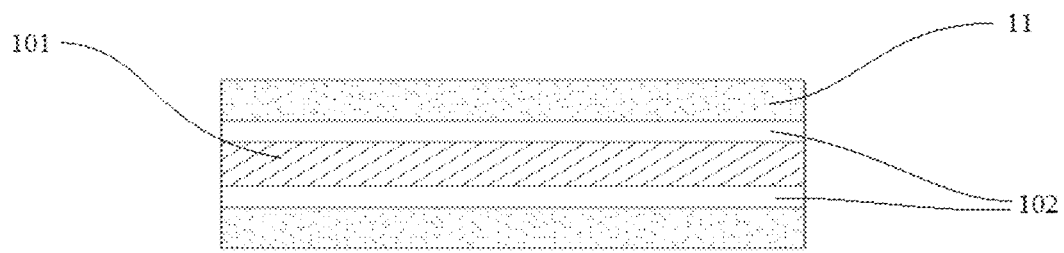
FIG. 5 is a schematic structural cross-sectional view of a positive electrode plate according to an embodiment of this application.
Figure 6:
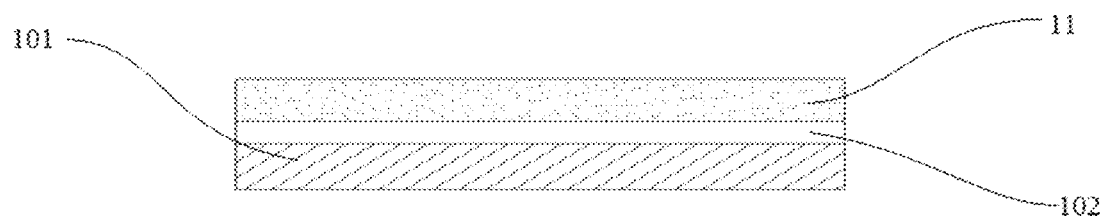
FIG. 6 is a schematic structural cross-sectional view of a positive electrode plate according to another embodiment of this application.

FIG. 5 and FIG. 6 are schematic structural diagrams of a positive electrode plate according to some embodiments of this application.

In FIG. 5, a positive electrode plate includes a positive electrode current collector 10 and positive electrode active material layers 11 that are disposed on two opposite surfaces of the positive electrode current collector 10. The positive electrode current collector 10 includes a positive electrode current collector support layer 101, positive electrode current collector conductive layers 102 that are disposed on two opposite surfaces of the positive electrode current collector support layer 101, and a positive electrode protection layer 103 (not shown in the figure) that is disposed on one side or two sides of the positive electrode conductive layer 102.

In FIG. 6, a positive electrode plate includes a positive electrode current collector 10 and a positive electrode active material layer 11 that is disposed on one surface of the positive electrode current collector 10. The positive electrode current collector 10 includes a positive electrode current collector support layer 101, a positive electrode current collector conductive layer 102 that is disposed on one surface of the positive electrode current collector support layer 101, and a positive electrode protection layer 103 (not shown in the figure) that is disposed on one side or two sides of the positive electrode conductive layer 102.

As shown in FIG. 5 and FIG. 6, the electrode active material layer may be disposed on one surface of the current collector, or may be disposed on two surfaces of the current collector.

A person skilled in the art can understand that, when a current collector provided with double-sided conductive layers is used, the positive electrode plate may be obtained through double-sided coating (that is, electrode active material layers are disposed on two surfaces of the current collector), or only single-sided coating (that is, the electrode active material layer is only disposed on one surface of the current collector); and when the current collector provided with only a single-sided conductive layer is used, the positive electrode plate may be obtained only through single-sided coating, and the electrode active material layer may be applied only on one surface of the current collector provided with the conductive layer.

Figure 7:
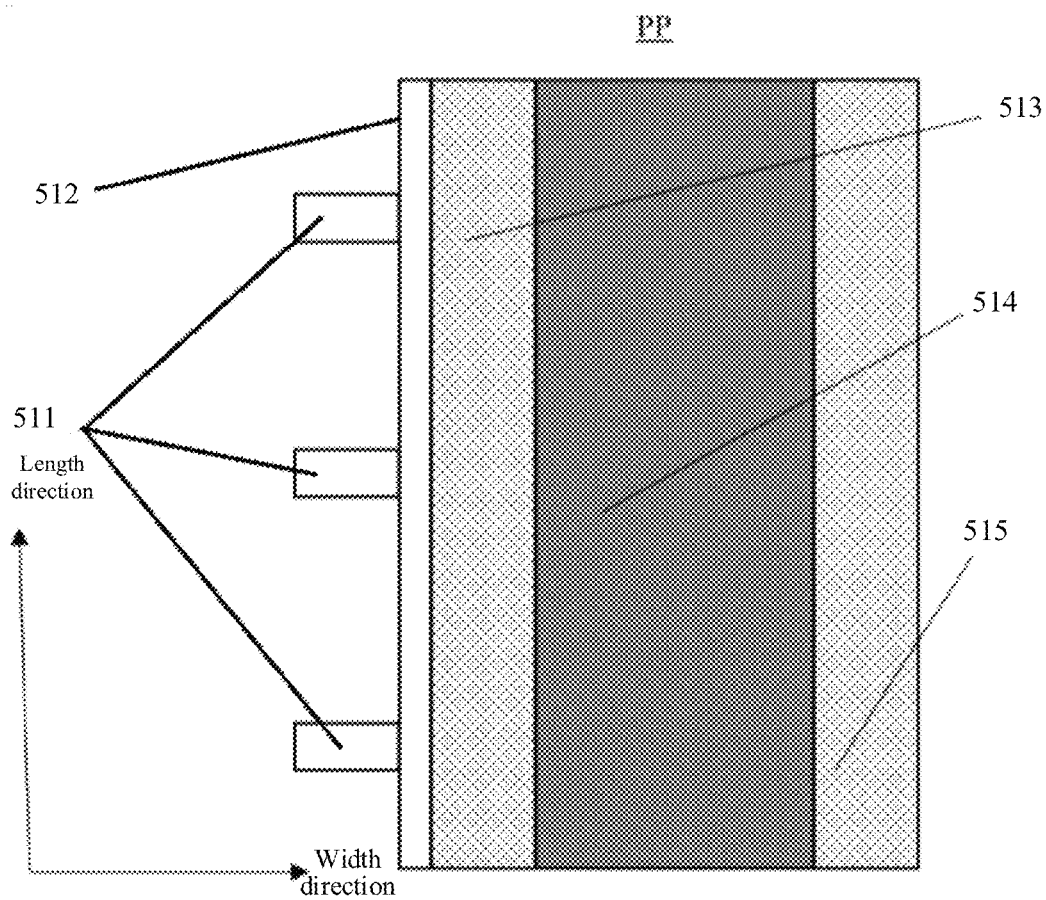
FIG. 7 is a schematic structural vertical view of a positive electrode plate according to an embodiment of this application.

FIG. 7 is a schematic structural vertical view of a positive electrode plate according to some embodiments of this application. The positive electrode plate PP includes a body of the electrode plate and one or more tabs 511 electrically connected to the body of the electrode plate. Based on different electrode active material layers for coating, the body of the electrode plate includes four zones: a clear zone 512 directly connected to the tab 511 (that is, a zone that is on the surface of the current collector and that is not coated with the active material layer), a first zone 513 with low compacted density, a zone 514 with high compacted density, and a second zone 515 with low compacted density. That is, viewed in the width direction of the coated surface of the positive electrode plate PP, the electrode active material layer includes 3 zones (that is, 2n+1 zones, where n=1) based on the compacted density. In addition, compacted density of a middle zone 514 is higher than compacted density of zones 513 and 515 on the two sides.

A person skilled in the art understands that the clear zone on the electrode plate is disposed for processing convenience, safety, or the like, and the clear zone is optional. Based on a need, the electrode plate can include 0, 1, or 2 clear zones (one clear zone on each outer side of the two zones with the low compacted density).

In this application, a ratio of the middle zone with the high compacted density to a total coated zone (that is, a ratio of a width of the zone 514 to a sum of a width of the zone 513, a width of the zone 514, and a width of the zone 515 in this instance) may be, for example, 20% to 80%, preferably, 30% to 70%, preferably, 40% to 60%, and more preferably, 45% to 55%. Widths of the two zones with low compacted density may be the same or different, and preferably, the same.

In this application, the compacted density of the zone with the low compacted density may be approximately 5% to 30%, such as 7% to 25%, 8% to 20%, or 8% to 18%, lower than the compacted density of the zone with the high compacted density.

[Electrochemical Apparatus]

The second aspect of this application relates to an electrochemical apparatus, including a positive electrode plate, a negative electrode plate, a separator, and an electrolyte, where the positive electrode plate is the positive electrode plate according to the first aspect of this application.

The electrochemical apparatus may be a capacitor, a primary battery, or a secondary battery. For example, the electrochemical apparatus may be a lithium-ion capacitor, a lithium-ion primary battery, or a lithium-ion secondary battery. A method for constructing and preparing the electrochemical apparatus is well known, except the positive electrode plate used in this application. Because the positive electrode plate in this application is used, the electrochemical apparatus can have high energy density, improved safety (for example, nail penetration safety) and electrochemical performance. In addition, because the positive electrode plate in this application can be easily processed, manufacturing costs of the electrochemical apparatus using the positive electrode plate in this application can be reduced.

In the electrochemical apparatus in this application, none of the negative electrode plate, the separator, and the electrolyte is specifically limited to a specific type and composition, and may be selected based on an actual requirement. Specifically, the separator may be selected from a polyethylene film, a polypropylene film, a polyvinylidene fluoride film, and a multilayer composite film thereof. When the battery is a lithium-ion battery, a non-aqueous electrolyte is generally used as its electrolyte. As the non-aqueous electrolyte, a lithium salt solution dissolved in an organic solvent is generally used. The lithium salt is, for example, an inorganic lithium salt such as $LiClO_4$, $LiPF_6$, $LiBF_4$, $LiAsF_6$, or $LiSbF_6$, or an organic lithium salt such as $LiCF_3SO_3$, $LiCF_3CO_2$, $Li_2C_2F_4(SO_3)_2$, $LiN(CF_3SO_2)_2$, $LiC(CF_3SO_2)_3$, or $LiC_nF_{2n+1}SO_3$ ($n \geq 2$). The organic solvent used in the non-aqueous electrolyte is, for example, cyclic carbonate such as ethylene carbonate, propylene carbonate, butylene carbonate, and vinylene carbonate, chain carbonate such as dimethyl carbonate, diethyl carbonate, and methyl ethyl carbonate, chain ester such as methyl propionate, cyclic ester such as γ-butyrolactone, chain ether such as dimethoxyethane, diethyl ether, diethylene glycol dimethyl ether, and triethylene glycol dimethyl ether, cyclic ether such as tetrahydrofuran and 2-methyltetrahydrofuran, nitrile such as acetonitrile and propionitrile, or a mixture of these solvents. For the negative electrode plate, various negative electrode active materials commonly used in the art may be selected. For example, for the lithium battery, a negative electrode active material may be selected from carbon materials such as graphite (artificial graphite or natural graphite), conductive carbon black, and carbon fiber, metal or semi-metal materials such as Si, Sn, Ge, Bi, Sn, and In, and their alloys, lithium-containing nitrides or lithium-containing oxides, lithium metal or lithium aluminum alloys, and the like.

In some embodiments, the electrochemical apparatus may include an outer package for encapsulating the positive electrode plate, the negative electrode plate, and an electrolyte. As an example, the positive electrode plate, the negative electrode plate, and the separator may be laminated or wound to form an electrode assembly of a laminated structure or an electrode assembly of a wound structure, and the electrode assembly is encapsulated in an outer package. The electrolyte may be a liquid electrolyte, and the liquid electrolyte infiltrates into the electrode assembly. There may be one or more electrode assemblies in the electrochemical apparatus, and a quantity of the electrode assemblies may be adjusted as required.

In some embodiments, the outer package of the electrochemical apparatus may be a soft package, for example, a soft bag. A material of the soft package may be plastic, for example, may include one or more of polypropylene (PP), polybutylene terephthalate (PBT), polybutylene succinate (PBS), and the like. Alternatively, the outer package of the electrochemical apparatus may be a hard shell, for example, an aluminum shell.

Figure 9:
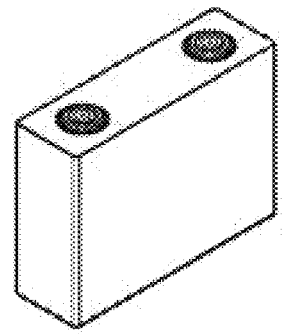
FIG. 9 is a schematic diagram of an embodiment of an electrochemical apparatus according to this application.

This application sets no particular limitation on a shape of the electrochemical apparatus, and the electrochemical apparatus may have a cylindrical, square, or any other shape. FIG. 9 shows an electrochemical apparatus 5 of a square structure used as an example.

In some embodiments, electrochemical apparatuses may be assembled into a battery module, and the battery module may include a plurality of electrochemical apparatuses. A specific quantity may be adjusted based on application and capacity of the battery module.

Figure 10:
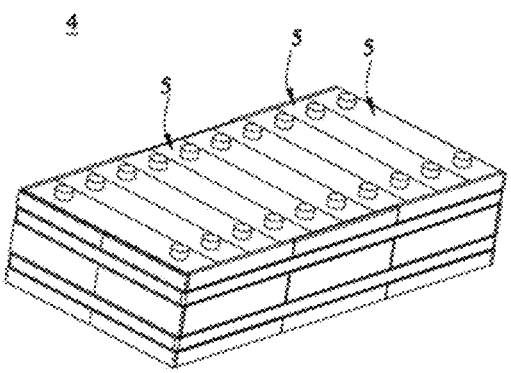
FIG. 10 is a schematic diagram of an embodiment of a battery module according to this application.

FIG. 10 shows a battery module 4 used as an example. Referring to FIG. 10, in a battery module 4, a plurality of electrochemical apparatuses 5 may be arranged in sequence in a length direction of the battery module 4. Certainly, the electrochemical apparatuses may alternatively be arranged in any other manner. Further, the plurality of electrochemical apparatuses 5 may be fastened by using fasteners.

Optionally, the battery module 4 may further include a housing with accommodating space, and the plurality of electrochemical apparatuses 5 are accommodated in the accommodating space.

In some embodiments, battery modules may be further assembled into a battery pack, and a quantity of battery modules included in the battery pack may be adjusted based on application and capacity of the battery pack.

Figure 11:
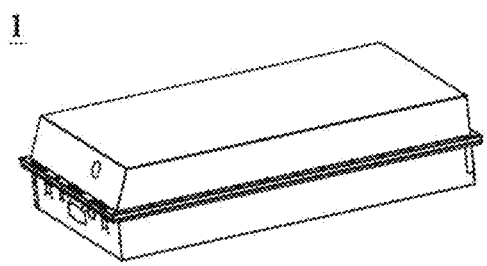
FIG. 11 is a schematic diagram of an embodiment of a battery pack according to this application.
Figure 12:
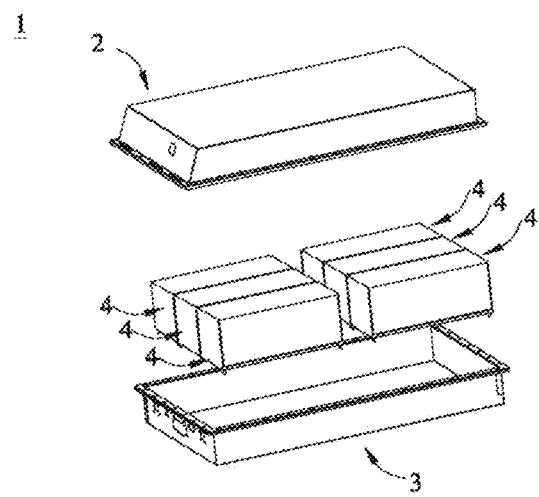
FIG. 12 is an exploded view of FIG. 11.

FIG. 11 and FIG. 12 show a battery pack 1 used as an example. Referring to FIG. 11 and FIG. 12, the battery pack 1 may include a battery box and a plurality of battery modules 4 arranged in the battery box. The battery box includes an upper box body 2 and a lower box body 3. The upper box body 2 can cover the lower box body 3 to form enclosed space for accommodating the battery modules 4. The plurality of battery modules 4 may be arranged in the battery box in any manner.

[Apparatus]

The third aspect of this application relates to an apparatus, including the electrochemical apparatus according to the second aspect of this application. The electrochemical apparatus provides power to the apparatus. The apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like. In addition, the electric train, the ship, and the satellite all are carrying tools and belong to vehicles (vehicle) in a broad sense.

The electrochemical apparatus, a battery module, or a battery pack may be selected for the apparatus according to use requirements for the apparatus.

Figure 13:
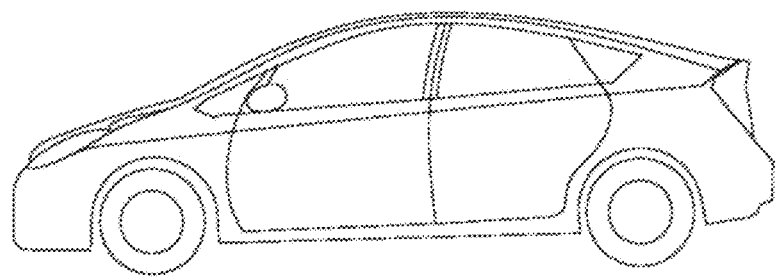
FIG. 13 is a schematic diagram of an embodiment of an apparatus using an electrochemical apparatus as a power source according to this application.

FIG. 13 shows an apparatus used as an example. The apparatus is a battery electric vehicle, a hybrid electric vehicle, a plug-in hybrid electric vehicle, or the like. To meet a requirement of the apparatus for high power and high energy density of the electrochemical apparatus, a battery pack or a battery module may be used.

In another example, the apparatus may be a mobile phone, a tablet computer, a notebook computer, or the like. The apparatus usually requires lightness and thinness, and the electrochemical apparatus may be used as a power source.

A person skilled in the art may understand that the foregoing definitions or preferred ranges of component selection, component content, and material physicochemical performance parameters in electrode plates, electrode active material layers, and the like in different embodiments of this application may be randomly combined, and various embodiments obtained through the combination shall still fall within the scope of this application and shall be considered as a part of content disclosed in this specification.

Unless otherwise specified, various parameters in this specification have general meanings well known in the art, and may be measured by using a method well known in the art. For example, a test may be conducted in a method provided in an embodiment of this application. In addition, preferred ranges and options of different parameters provided in various preferred embodiments may be randomly combined, and it is considered that various combinations obtained shall fall within the disclosed scope of this application.

The following further describes advantageous effects of this application with reference to examples.

EXAMPLES (I) Preparation of a Current Collector

Current collectors used in the electrode plates in examples and comparative examples were prepared as follows:

1. Preparation of a Current Collector without a Protection Layer:

A support layer of a specific thickness was selected, and a conductive layer of a specific thickness was formed on a surface of the support layer through vacuum evaporating, mechanical roll-in, or bonding.

(1) The forming conditions of the vacuum evaporation method are as follows: The support layer subjected to surface cleaning treatment was placed into a vacuum evaporation chamber, and high-purity metal wires in the metal evaporation chamber were melted and evaporated at a high temperature of 1600° C. to 2000° C. The evaporated metal went through the cooling system in the vacuum evaporation chamber, and finally was deposited on the surface of the support layer to form a conductive layer.

(2) The forming conditions of the mechanical roll-in method are as follows: The foil of the conductive layer material was placed in a mechanical roller, and compacted to a predetermined thickness through rolling by applying pressure of 20 t to 40 t, and then placed onto the surface of the support layer on which a surface cleaning processing had been performed. Finally, the two were placed in the mechanical roller to be tightly bonded by applying pressure of 30 t to 50 t.

(3) The forming conditions of the bonding method are as follows: The foil of the conductive layer material was placed in a mechanical roller, and rolling compacted to a predetermined thickness by applying a pressure of 20 t to 40 t, and then the surface of the support layer subjected to a surface cleaning treatment was coated with a mixed solution of PVDF and NMP. Finally, the conductive layer of the predetermined thickness was adhered to the surface of the support layer, and dried at 100° C.

2. Preparation of a Current Collector with a Protection Layer

The current collector with the protection layer may be prepared in the following manners:

(1) First, a protection layer was disposed on a surface of a support layer by using a vapor deposition method or a coating method, and then a conductive layer of a specified thickness was formed on the surface of the support layer with the protection layer through vacuum evaporating, mechanical roll-in, or bonding to prepare a current collector with a protection layer (the protection layer was located between the support layer and the conductive layer). In addition, on the basis of the above, another protection layer was formed on the surface of the conductive layer farther away from the support layer by using a vapor deposition method, an in-situ formation method, or a coating method to prepare a current collector with protection layers (the protection layers were located on two opposite surfaces of the conductive layer).

(2) First, a protection layer was formed on one surface of the conductive layer by using a vapor deposition method, an in-situ formation method, or a coating method, and then the above conductive layer with the protection layer was disposed on the surface of the support layer through mechanical roll-in or bonding, with the protection layer located between the support layer and the conductive layer, to prepare a current collector with a protection layer (the protection layer was located between the support layer and the conductive layer). In addition, on the basis of the above, another protection layer was formed on the surface of the conductive layer farther away from the support layer by using a vapor deposition method, an in-situ formation method, or a coating method to prepare a current collector with protection layers (the protection layers were located on two opposite surfaces of the conductive layer).

(3) First, a protection layer was formed on one surface of the conductive layer by using a vapor deposition method, an in-situ formation method, or a coating method, and then the above conductive layer with the protection layer was disposed on the surface of the support layer through mechanical roll-in or bonding, with the protection layer located on the surface of the conductive layer farther away from the support layer, to prepare a current collector with a protection layer (the protection layer was located on the surface of the conductive layer farther away from the support layer).

(4) First, protection layers were formed on two surfaces of the conductive layer by using a vapor deposition method, an in-situ formation method, or a coating method, and then the above conductive layer with the protection layers was disposed on the surface of the support layer through mechanical roll-in or bonding to prepare a current collector with protection layers (the protection layers were located on two opposite surfaces of the conductive layer).

(5) On the basis of the above "preparation of a current collector without a protection layer", another protection layer was formed on the surface of the conductive layer farther away from the support layer by using a vapor deposition method, an in-situ formation method, or a coating method to prepare a current collector with a protection layer (the protection layer was located on the surface of the conductive layer farther away from the support layer).

In the preparation instance, for the vapor deposition method, a vacuum evaporating method was used; for the in-situ formation method, an in-situ passivation method was used; and for the coating method, a blade coating method was used.

The forming conditions of the vacuum evaporation method are as follows: A sample subjected to a surface cleaning treatment was placed into a vacuum evaporation chamber, and the protection layer material in the evaporation chamber was melted and evaporated at a high temperature of 1600° C. to 2000° C. The evaporated protection layer material went through the cooling system in the vacuum evaporation chamber, and finally was deposited on the surface of the sample to form a protection layer.

The forming conditions of the in-situ passivation method are as follows: The conductive layer was placed in a high-temperature oxidation environment, the temperature was controlled at 160° C. to 250° C., the oxygen supply was maintained in the high-temperature environment, and the processing time was 30 minutes, thereby forming a metal oxide type protection layer.

The formation conditions of the gravure coating method are as follows: The protection layer material and NMP were stirred and mixed, and then a slurry with the above protection layer material (solid content was 20% to 75%) was applied on a surface of the sample, and then the thickness of the coating was controlled by a gravure roller, and finally the coating was dried at 100° C. to 130° C.

(II) Impact of Zone Distribution of an Electrode Active Material Layer on Flatness of an Electrode Plate The following describes impact of different coating methods of the electrode active material layer on the flatness of the electrode plate in the embodiments of this application. In this application, the following three different types of positive electrode plates were respectively compared in terms of flatness.

(1) Positive Electrode Plate Obtained Through Partition Coating

The used composite current collector had two surfaces of 10 μm PET on which an Al layer with a thickness of 1 μm was vapor-deposited.

A 92 wt % positive electrode active material NCM333, a 5 wt % conductive agent Super-P ("SP" for short), and a 3 wt % PVDF were mixed with a solvent NMP, and stirred well to prepare a positive electrode active material layer slurry.

Partition coating was performed on two surfaces of the composite current collector through extrusion coating. That is, a middle zone was a zone with a high coating weight, and zones on two sides were zones with a low coating weight (which could be implemented by extruding a spacer or a baffle plate), and drying was performed at 85° C. A width of the zone with the high coating weight was 4 cm, and both widths of the zones with the low coating weight were 2.1 cm.

Then cold-pressing and cutting were performed, and drying was performed for four hours in an 85° C. vacuum condition, and tabs were welded, thereby obtaining a positive electrode plate.

Compacted density of the zone with a high coating weight was 3.45 g/cm$^3$, and compacted density of both the zones with a low coating weight was 3.3 g/cm$^3$.

A compacted density testing method: 30 wafers with areas of S were first cut from the current collector, and the weight and thickness of the 30 wafers were measured. An average weight $m_1$ and an average height $H_1$ were calculated. 30 wafers with areas of S were then cut from the electrode plate, and an average weight $m_2$ and an average height $H_2$ were calculated. In this way:

Compacted density=$(m_2-m_1)/((H_2-H_1)\times S)$.

(2) Evenly Coated Comparative Positive Electrode Plate:

The foregoing composite current collector with Al-coated PET with a thickness of 10 μm was also used as the current collector, and was prepared in a method similar to the preparation method of the foregoing positive electrode plate. However, the positive electrode active material layer slurry was directly evenly applied on two surfaces of the composite current collector. That is, no partitioning processing was performed. Then, post-processing was performed to obtain an evenly coated comparative positive electrode plate. Compacted density of the positive electrode active material layer was 3.4 g/cm$^3$.

(3) Conventional Positive Electrode Plate

The current collector was Al foil with a thickness of 12 μm. Similar to that in the preparation method of the above comparative positive electrode plate, the positive electrode active material layer slurry was evenly directly applied on the two surfaces of the current collector of the Al foil, and then the conventional positive electrode plate was obtained through post-processing.

Flatness of the foregoing three different electrode plates was measured. A flatness test of the electrode plate was conducted by measuring an arc height of the electrode plate relative to a reference plane. The arc height was measured specifically as follows:

An electrode plate sample of a length of 2 m was taken, placed on the reference plane and expanded in a width direction of the plane, where the width of the plane was slightly less than a length of the electrode plate sample. Heavy objects with a same weight (1 Kg) were then placed on both sides of the sample, so that the sample was attached to the plane. Then a soft ruler was used to measure a height of a middle zone of the sample above the plane, and the height above the plane was the arc height. During actual production, the electrode plate with an arc height less than or equal to 2 mm was usually considered to be flat, and the positive electrode plate and the negative electrode plate can be accurately aligned when assembled into a battery.

The following table shows specific measurement results:

| Electrode plate | Arc height |
| --- | --- |
| Positive electrode plate obtained through partition coating | Less than 2 mm |
| Evenly coated comparative positive electrode plate | Greater than 5 mm |
| Conventional positive electrode plate | Less than 2 mm |

It can be learned from the measurement results in the foregoing table that, the conventional positive electrode plate using a metal current collector met a requirement for flatness of the electrode plate (the arc height was less than or equal to 2 mm), which could implement accurate alignment during battery assembly. However, if the composite current collector was evenly coated according to the conventional process, the arc height of the electrode plate was relatively great (greater than 5 mm), the flatness of the electrode plate was not desirable, which made it difficult to implement accurate alignment during battery assembly. However, after the partition coating process in this application was used, the arc height was significantly reduced, which was similar to that of the conventional electrode plate, thereby implementing accurate alignment during battery assembly. It can be learned that the special design of the partition coating of the active material layer could eliminate or reduce possible edge warping and curvature of the electrode plate including the composite current collector after roll-in, flatness of the electrode plate was improved, and accurate alignment was implemented during battery assembly. In addition, the battery could also have excellent electrochemical performance and safety performance brought by the composite current collector.

(III) Effect of Other Factors Such as a Structure and Composition of an Electrode Plate on Improvement of Electrochemical Performance of a Battery The following describes the impact of the structure and composition of the electrode plates (such as the composition of the current collector, existence of a conductive primer layer, the thickness and composition of the electrode active material layer) on battery performance.

It should be noted that in the following examples in which the composite current collector was used to prepare the electrode plate, a partition coating method of the active material layer was used to ensure final flatness of the electrode plate and accuracy of an electrochemical performance measurement result. However, a person skilled in the art can understand that the partition coating of the active material layer was not the only method to implement an even electrode plate, and the person skilled in the art can also implement the even electrode plate in another alternative method.

1. Preparation of an Electrode Plate:
(1) Positive Electrode Plate in an Example (Double Coating):

A positive electrode plate that had a lower positive electrode active material layer (interior zone) and an upper positive electrode active material layer (exterior zone) was coated by using a double coating method.

A conductive agent (for example, conductive carbon black), a binder (for example, PVDF or polyacrylic acid), and an optional positive electrode active material that were proportioned were dissolved in a proper solvent (for example, NMP or water) in a certain proportion, and stirred well to form a primer slurry.

The primer slurry (that is, a slurry for a lower positive electrode active material layer) was evenly applied on two surfaces of the composite current collector prepared according to the above method at a coating speed 20 m/min. The primer layer was dried with an oven temperature of 70° C. to 100° C. for 5 minutes.

After the primer layer (that is, the lower positive electrode active material layer) was completely dried, a 92 wt % positive electrode active material (if no specific material was specified, NCM333 was used by default), a 5 wt % conductive agent Super-P ("SP" for short), and a 3 wt % PVDF were mixed with a solvent NMP, and stirred well to prepare an upper layer slurry (composition of the active material layer slurry in some examples might vary, and in this case, specified composition in the examples should prevail). Extrusion coating was performed to apply, through partition coating, the upper layer slurry on the surface of the dried primer layer, and drying was performed at 85° C. to obtain a positive electrode active material layer.

Then the current collector having various coating layers was cold-pressed and cut, and dried for four hours in an 85° C. vacuum condition, and tabs were welded, thereby obtaining a positive electrode plate.

(2) Positive Electrode Plate in an Example (Single Coating):

It was prepared by using a method similar to the method for preparing a positive electrode plate (double coating) in the foregoing example. However, an upper layer slurry was directly applied on a surface of a composite current collector through partition coating, and no lower positive electrode active material layer (primer layer) was disposed.

(3) Conventional Positive Electrode Plate:

A current collector was Al foil with a thickness of 12 μm. Similar to the method for preparing a positive electrode plate (single coating), an upper layer slurry was directly applied on the surface of the Al foil current collector, and then a conventional positive electrode plate was obtained through post-processing.

(4) Conventional Negative Electrode Plate:

A negative electrode active substance artificial graphite, a conductive agent Super-P, a thickener CMC, and a binder SBR were added to the deionized water solvent at a mass ratio of 96.5:1.0:1.0:1.5, and well mixed to prepare a negative electrode active material layer slurry. Extrusion coating was performed to evenly apply the negative electrode active material layer slurry on two surfaces of 8 μm Cu foil (negative electrode current collector), and drying was performed at 85° C. to obtain a negative electrode active material layer. Then post-processing was performed to obtain a conventional negative electrode plate.

In a preparation process of the foregoing positive electrode plate, for the composite current collector, to obtain the even electrode plate, the active material slurry was applied in the partition coating method in this application. For specific parameter settings of the partition coating, such as a width, compacted density, and the like of each zone, settings similar to those described in the previous sections of "Positive electrode plate obtained through partition" were used.

2. Preparation of a Battery:

Through a common battery manufacturing process, a positive electrode plate (compacted density: 3.4 g/cm$^3$), a PP/PE/PP separator, and a negative electrode plate (compacted density: 1.6 g/cm$^3$) were wound together to form a battery assembly, then the electrode assembly was placed into a battery housing, the electrolyte (an EC:EMC volume ratio was 3:7, and LiPF$_6$ was 1 mol/L) was injected, and then sealing, formation, and other processes were performed to finally obtain a lithium-ion secondary battery (hereinafter referred to as the battery).

3. Battery Testing Method:
(1) Lithium-Ion Battery Cycle Life Testing Method:

The lithium-ion battery was charged and discharged at 45° C. That is, the lithium-ion battery was charged to 4.2 V at a current of 1C, and then discharged to 2.8 V at a current of 1C, and the discharge capacity during a first cycle was recorded. 1000 cycles of 1C/1C charge and discharge were then performed on the battery, and the battery discharge capacity during a $1000^{th}$ cycle was recorded. The discharge capacity during the $1000^{th}$ cycle was divided by the discharge capacity during the first cycle to obtain the capacity retention rate during the $1000^{th}$ cycle.

(2) DCR Growth Rate Testing Method:

At 25° C., the secondary battery was adjusted to 50% SOC at a current of 1C, and a voltage U1 was recorded. Then the battery was discharged at a current of 4C for 30 seconds, and a voltage U2 was recorded. DCR=(U1−U2)/4C. Then the battery was charged and discharged for 500 cycles at a current of 1C/1C, and DCR in a 500$^{th}$ cycle was recorded. The DCR in the 500$^{th}$ cycle was divided by the DCR in the first cycle, then 1 was subtracted, and a DCR growth rate in the 500$^{th}$ cycle was obtained.

(3) Needle Penetration Test:

The secondary batteries (10 samples) were fully charged to the cut-off voltage at a current of 1C, and then charged at a constant voltage until the current dropped to 0.05C, and then charging was stopped. A φ8 mm high temperature resistant steel needle was used to penetrate at a speed of 25 mm/s from a direction perpendicular to a battery electrode plate, and the penetration position needed to be close to the geometric center of the punctured surface. Whether the battery had a phenomenon of burning and explosion while the steel needle stayed in the battery was observed.

4. Test Results and Discussion 4.1 Effect of a Composite Current Collector on Improvement of Mass Energy Density of a Battery Specific parameters of the current collector and the electrode plate in the examples are shown in Table 1 (no current collector in the examples listed in Table 1 is provided with a protection layer). In Table 1, the weight percentage of the current collector refers to a percentage obtained by dividing the weight of the positive electrode current collector per unit area by the weight of the conventional positive electrode current collector per unit area.

It may be learned from Table 1 that, compared with the conventional current collector (Al, 12 μm), the weight of the positive electrode current collector according to this application was reduced to different degree, thereby improving the mass energy density of the battery. However, when the thickness of the conductive layer was greater than 1.5 μm, the weight reduction degree of the current collector became smaller.

In addition, the effect of improving nail penetration safety of the battery by the composite current collector was also studied. Table 1-1 shows composition of the tested positive electrode plates (single coating was performed on each electrode plate), and Table 1-2 shows the results of the nail penetration tests.

TABLE 1-1

| Electrode plate number | Support layer | | Conductive layer | | Electrode active material layer | | $D_{total}$ |
|---|---|---|---|---|---|---|---|
| | Material | D1 | Material | D2 | Material | D4 | 2D4 |
| Positive electrode Plate 11 | PI | 2 μm | Al | 800 nm | NCM811 | 55 μm | 110 μm |
| Positive electrode Plate 12 | PI | 5 μm | Al | 2 μm | NCM811 | 55 μm | 110 μm |
| Positive electrode Plate 13 | PI | 6 μm | Al | 300 nm | NCM811 | 55 μm | 110 μm |
| Positive electrode Plate 14 | PET | 5 μm | Al | 500 nm | NCM811 | 55 μm | 110 μm |

TABLE 1

| Electrode plate number | Current collector number | Support layer | | Conductive layer | | Current collector thickness | Weight percentage of current collector |
|---|---|---|---|---|---|---|---|
| | | Material | D1 | Material | D2 | | |
| Positive electrode plate 1 | Positive electrode current collector 1 | PI | 6 μm | Al | 300 nm | 6.6 μm | 30.0% |
| Positive electrode plate 2 | Positive electrode current collector 2 | PET | 4 μm | Al | 500 nm | 5 μm | 24.3% |
| Positive electrode plate 3 | Positive electrode current collector 3 | PET | 2 μm | Al | 200 nm | 2.4 μm | 11.3% |
| Positive electrode plate 4 | Positive electrode current collector 4 | PET | 10 μm | Al | 1 μm | 12 μm | 56.5% |
| Positive electrode plate 5 | Positive electrode current collector 5 | PET | 10 μm | Al | 1.5 μm | 13 μm | 65% |
| Positive electrode plate 6 | Positive electrode current collector 6 | PET | 10 μm | Al | 2 μm | 14 μm | 73.5% |
| Conventional positive electrode plate | Conventional positive electrode current collector | / | / | Al | / | 12 μm | 100% |

TABLE 1-1-continued

| Electrode plate number | Support layer Material | D1 | Conductive layer Material | D2 | Electrode active material layer Material | D4 | $D_{total}$ 2D4 |
|---|---|---|---|---|---|---|---|
| Positive electrode Plate 15 | PET | 10 μm | Al | 1 μm | NCM811 | 55 μm | 110 μm |
| Positive electrode plate 16 | PET | 8 μm | Al | 1.5 μm | NCM811 | 55 μm | 110 μm |

TABLE 1-2

| Battery number | Positive electrode plate | Negative electrode plate | Nail penetration test result |
|---|---|---|---|
| Battery 60 | Conventional positive electrode plate | Conventional negative electrode plate | All failed |
| Battery 61 | Positive electrode plate 11 | Conventional negative electrode plate | All passed |
| Battery 62 | Positive electrode plate 12 | Conventional negative electrode plate | All passed |
| Battery 63 | Positive electrode plate 13 | Conventional negative electrode plate | All passed |
| Battery 64 | Positive electrode plate 14 | Conventional negative electrode plate | All passed |
| Battery 65 | Positive electrode plate 15 | Conventional negative electrode plate | All passed |
| Battery 66 | Positive electrode plate 16 | Conventional negative electrode plate | All passed |

Because a lithium-ion battery using the composite current collector had a thinner conductive layer than the conventional metal current collector, metal burrs generated in abnormal cases such as nail penetration were relatively small, and a support layer of the composite current collector had larger short-circuit resistance, thereby improving nail penetration safety performance of the battery. It may be learned from the foregoing table that, the conventional battery had thermal runaway and destruction in the nail penetration case and could not pass the nail penetration safety test. All lithium-ion batteries using the composite current collector could pass the nail penetration safety test.

4.2 Effect of a Protection Layer on Improvement of Electrochemical Performance of a Composite Current Collector On the basis of the current collector of each example listed in Table 1, a protection layer was further formed to investigate the effect of a protection layer on improvement of the electrochemical performance of the composite current collector. The "positive electrode current collector 2-1" in Table 2 means a current collector obtained by forming a protection layer on the basis of the "positive electrode current collector 2" in Table 1. Numbers of other current collectors have similar meanings.

TABLE 2

| Electrode plate number | Current collector number | Upper protection layer Material | D3' | Lower protection layer Material | D3" |
|---|---|---|---|---|---|
| Positive electrode plate 2-1 | Positive electrode current collector 2-1 | Nickel oxide | 10 nm | Nickel oxide | 8 nm |
| Positive electrode plate 2-2 | Positive electrode current collector 2-2 | Nickel oxide | 50 nm | Nickel oxide | 30 nm |

Table 3 shows cycling performance data measured after a battery is assembled by using an electrode plate (single coating) listed in Table 2.

TABLE 3

| Battery number | Electrode plate | | Capacity retention rate at 45° C. in the $1000^{th}$ cycle |
|---|---|---|---|
| Battery 1 | Conventional negative electrode plate | Conventional positive electrode plate | 86.5% |
| Battery 2 | Conventional negative electrode plate | Positive electrode plate 2 | 80.7% |
| Battery 3 | Conventional negative electrode plate | Positive electrode plate 2-1 | 85.2% |
| Battery 4 | Conventional negative electrode plate | Positive electrode plate 2-2 | 85.4% |

As shown in Table 3, compared with the battery 1 using the conventional positive electrode plate and the conventional negative electrode plate, the battery using the composite current collector had good cycle life and had cycling performance equivalent to that of the conventional battery. Especially for a battery manufactured by using a current collector with a protection layer, compared with a battery manufactured by using a current collector without a protection layer, a capacity retention rate of the battery could be further improved, which indicates that the battery is more reliable.

4.3. Effect of a Primer Layer (Interior Zone) on Improvement of Electrochemical Performance of a Battery In this example, a two-layer coating method was used to form an electrode active material layer on a current collector to form an electrode plate. Therefore, the electrode active material layer was divided into two parts: an interior zone (which may be referred to as a "lower electrode active material layer") and an exterior zone (which may be referred to as an "upper electrode active material layer"). Because the conductive agent content of the lower active material layer was higher than the conductive agent content of the upper active material layer, the lower electrode active material layer may also be referred to as a conductive primer layer (or primer layer for short).

The following describes functions of factors such as the primer layer and composition of the primer layer in improving electrochemical performance of a battery. Table 4 shows the specific composition and related parameters of the batteries in all examples and comparative examples, and the electrode plates and current collectors used therein. Table 5 shows a performance measurement result of each battery.

TABLE 4

| Electrode plate number | Current collector number | Support layer Material | D1 | Conductive layer Material | D2 | Primer layer (interior zone) | Upper active material layer (exterior zone) |
|---|---|---|---|---|---|---|---|
| Comparative positive electrode plate 20 | Positive electrode current collector 4 | PET | 10 μm | Al | 1 μm | / | NCM333, D50 9.8 μm, an active material layer with a thickness of 55 μm |
| Positive electrode plate 21 | Positive electrode current collector 4 | PET | 10 μm | Al | 1 μm | 10% conductive carbon black, 90% aqueous polyacrylic acid, with a thickness of 1.5 μm | Same as the above |
| Positive electrode plate 22 | Positive electrode current collector 4 | PET | 10 μm | Al | 1 μm | 20% conductive carbon black, 80% aqueous polyacrylic acid, with a thickness of 1.5 μm | Same as the above |
| Positive electrode plate 23 | Positive electrode current collector 4 | PET | 10 μm | Al | 1 μm | 50% conductive carbon black, 50% aqueous PVDF, with a thickness of 1.5 μm | Same as the above |
| Positive electrode plate 24 | Positive electrode current collector 4 | PET | 10 μm | Al | 1 μm | 65% conductive carbon black, 35% aqueous PVDF, with a thickness of 1.5 μm | Same as the above |
| Positive electrode plate 25 | Positive electrode current collector 4 | PET | 10 μm | Al | 1 μm | 80% conductive carbon black, 20% aqueous PVDF, with a thickness of 1.5 μm | Same as the above |
| Positive electrode plate 26 | Positive electrode current collector 4 | PET | 10 μm | Al | 1 μm | 99% conductive carbon black, 1% aqueous PVDF, with a thickness of 1.5 μm | Same as the above |
| Positive electrode plate 27 | Positive electrode current collector 4 | PET | 10 μm | Al | 1 μm | 65% conductive carbon black, 35% oily PVDF, with a thickness of 1.5 μm | Same as the above |
| Positive electrode plate 28 | Positive electrode current collector 4 | PET | 10 μm | Al | 1 μm | 80% conductive carbon black, 20% oily PVDF, with a thickness of 1.5 μm | Same as the above |

TABLE 4-continued

| Electrode plate number | Current collector number | Support layer Material | D1 | Conductive layer Material | D2 | Primer layer (interior zone) | Upper active material layer (exterior zone) |
|---|---|---|---|---|---|---|---|
| Positive electrode plate 29 | Positive electrode current collector 4 | PET | 10 μm | Al | 1 μm | 32.5% conductive carbon black, 32.5% flake conductive graphite (D50 0.05 μm), 35% aqueous PVDF, with a thickness of 1.5 μm | Same as the above |
| Positive electrode plate 30 | Positive electrode current collector 4 | PET | 10 μm | Al | 1 μm | 65% conductive carbon black, 35% aqueous PVDF, with a thickness of 500 nm | Same as the above |
| Positive electrode plate 31 | Positive electrode current collector 4 | PET | 10 μm | Al | 1 μm | 65% conductive carbon black, 35% aqueous PVDF, with a thickness of 2 μm | Same as the above |
| Positive electrode plate 32 | Positive electrode current collector 4 | PET | 10 μm | Al | 1 μm | 65% conductive carbon black, 35% aqueous PVDF, with a thickness of 5 μm | Same as the above |

TABLE 5

| Battery number | Electrode plate | | DCR growth rate |
|---|---|---|---|
| Battery 20 | Comparative positive electrode plate 20 | Conventional negative electrode plate | 35% |
| Battery 21 | Positive electrode plate 21 | Conventional negative electrode plate | 30.9% |
| Battery 22 | Positive electrode plate 22 | Conventional negative electrode plate | 29% |
| Battery 23 | Positive electrode plate 23 | Conventional negative electrode plate | 20% |
| Battery 24 | Positive electrode plate 24 | Conventional negative electrode plate | 15% |
| Battery 25 | Positive electrode plate 25 | Conventional negative electrode plate | 14.5% |
| Battery 26 | Positive electrode plate 26 | Conventional negative electrode plate | 14% |
| Battery 27 | Positive electrode plate 27 | Conventional negative electrode plate | 18.5% |
| Battery 28 | Positive electrode plate 28 | Conventional negative electrode plate | 18.2% |
| Battery 29 | Positive electrode plate 29 | Conventional negative electrode plate | 12.9% |
| Battery 30 | Positive electrode plate 30 | Conventional negative electrode plate | 15.5% |
| Battery 31 | Positive electrode plate 31 | Conventional negative electrode plate | 14.6% |
| Battery 32 | Positive electrode plate 32 | Conventional negative electrode plate | 14.1% |

It can be learned from the above test data that:

(1) When a composite current collector with a thin conductive layer (that is, a comparative positive electrode plate 20 not including a conductive primer layer because the two-layer coating method was not used for coating) was used, the battery had large DCR and a low cycle capacity retention rate due to shortcomings such as the composite current collector having poorer conductivity than a conventional metal current collector, and damage vulnerability of the conductive layer in the composite current collector. However, after a conductive primer layer using the two-layer coating method was introduced, by effectively mending and constructing a conductive network among the current collector, the conductive primer layer, and the active substance, the conductive primer layer helped to improve the electron transfer efficiency, and reduce the resistance between the current collector and the electrode active material layer, so that the DCR could be effectively reduced.

(2) With an increase of the conductive agent content of the conductive primer layer (the positive electrode plates 21 to 26), the DCR of the battery could be greatly reduced.
(3) Under the same composition, the aqueous binder could help to reduce the DCR more significantly than the oily binder (a positive electrode plate 24 vs. a positive electrode plate 27 and a positive electrode plate 25 vs. a positive electrode plate 28).
(4) The flake graphite could generate "horizontal sliding", thereby achieving a function of buffering, reducing the damage to the conductive layer of the current collector during the compaction, and reducing cracks. Therefore, the flake graphite could further reduce the DCR of the battery (a positive electrode plate 24 vs. a positive electrode plate 29).
(5) With the increase of the thickness of the conductive primer layer (a positive electrode plate 30 to a positive electrode plate 32), the DCR of the battery could be reduced more significantly. However, a too thick conductive primer layer was not conducive to the improvement of the energy density of the battery.

4.4. Effect of an Electrode Active Material in a Primer Layer

In the foregoing example, for ease of research, no electrode active material was added to the primer layers. The following tests impact of introduction of a positive electrode active material in a primer layer on performance of a battery. Table 6 and Table 7 show specific composition of electrode plates and composition of batteries.

TABLE 6

| Electrode plate number | Current collector number | Support layer Material | Support layer D1 | Conductive layer Material | Conductive layer D2 | Primer layer (interior zone) | Upper active material layer (exterior zone) |
|---|---|---|---|---|---|---|---|
| Comparative positive electrode plate 20 | Positive electrode current collector 4 | PET | 10 μm | Al | 1 μm | / | NCM333, D50 9.8 μm, an active material layer with a thickness of 55 μm |
| Positive electrode plate 37 | Positive electrode current collector 4 | PET | 10 μm | Al | 1 μm | 80% conductive carbon black, 15% aqueous polyacrylic acid, 5% NCM333, with a thickness of 1.5 μm | Same as the above |
| Positive electrode plate 38 | Positive electrode current collector 4 | PET | 10 μm | Al | 1 μm | 60% conductive carbon black, 20% aqueous polyacrylic acid, 20% NCM333, with a thickness of 1.5 μm | Same as the above |
| Positive electrode plate 39 | Positive electrode current collector 4 | PET | 10 μm | Al | 1 μm | 30% conductive carbon black, 20% aqueous polyacrylic acid, 50% NCM333, with a thickness of 1.5 μm | Same as the above |
| Positive electrode plate 40 | Positive electrode current collector 4 | PET | 10 μm | Al | 1 μm | 30% conductive carbon black, 20% aqueous polyacrylic acid, 50% LFP, with a thickness of 1.5 μm | Same as the above |

TABLE 7

| Battery number | Electrode plate | | DCR growth rate |
|---|---|---|---|
| Battery 20 | Comparative positive electrode plate 20 | Conventional negative electrode plate | 35% |
| Battery 37 | Positive electrode plate 37 | Conventional negative electrode plate | 14.2% |

TABLE 7-continued

| Battery number | Electrode plate | | DCR growth rate |
|---|---|---|---|
| Battery 38 | Positive electrode plate 38 | Conventional negative electrode plate | 14.9% |
| Battery 39 | Positive electrode plate 39 | Conventional negative electrode plate | 15.8% |
| Battery 40 | Positive electrode plate 40 | Conventional negative electrode plate | 16.5% |

It can be learned from the foregoing test data that regardless of whether a primer layer included an electrode active material, introduction of the primer layer could effectively mend and construct a conductive network among a current collector, a conductive primer layer, and an active substance, to improve electronic transmission efficiency and reduce the resistance between the current collector and an electrode active material layer, thereby effectively reducing DCR.

4.5 Effect of Sheet Resistance of an Electrode Active Material Layer on Improvement of Electrochemical Performance of a Battery The prepared current collector was used to prepare a positive electrode plate. Composition of the active material layer was adjusted to adjust the sheet resistance. The obtained positive electrode plate (having an active material layer of a single-sided thickness D4 of 55 μm) was assembled with conventional negative electrode plate to form a battery to measure nail penetration performance and cycle life of the battery. The results are shown in the table below.

TABLE 8

| Battery number | Composition of positive electrode active material layer | Sheet resistance (ohm) | Nail penetration test result | Capacity retention rate at 25° C. in the $1000^{th}$ cycle |
|---|---|---|---|---|
| Battery 41 | 94% NCM811 (D50 6.5 μm) + 5% Super P + 1% PVDF Primer layer: null | 0.1 | 5 passed, 5 failed | 92.3% |
| Battery 42 | 96% NCM811 (D50 6.5 μm) + 3% Super P + 1% PVDF Primer layer: null | 0.3 | 6 passed, 4 failed | 91.8% |
| Battery 43 | 96% NCM811 (D50 6.5 μm) + 2% Super P + 2% PVDF Primer layer: null | 0.6 | All passed | 89.8% |
| Battery 44 | 95.7% NCM811 (D50 7.5 μm) + 1.5% Super P + 2.8% PVDF Primer layer: null | 1.0 | All passed | 88.7% |
| Battery 45 | 95.5% NCM811 (D50 6.5 μm) + 0.5% Super P + 4% PVDF Primer layer: null | 1.5 | All passed | 85.1% |
| Battery 46 | 94% NCM811 (D50 6.5 μm) + 0.2% Super P + 5.8% PVDF Primer layer: null | 10 | All passed | 83.8% |
| Battery 47 | 96% NCM811 (D50 6.5 μm) + 2% Super P + 2% PVDF Primer layer: 73% Super P + 27% aqueous polyacrylic acid | 0.5 | All passed | 92.3% |
| Battery 48 | 96% NCM811 (D50 6.5 μm) + 2% Super P + 2% PVDF Primer layer: 2% carbon nanotube + 71% Super P + 27% aqueous polyacrylic acid | 0.38 | 7 passed, 3 failed | 93.5% |

*The specific test method is as follows: The lithium-ion battery was charged and discharged at 25° C., that is, first charged to 4.2 V at a current of 0.5 C, and then discharged to 2.8 V at a current of 1 C, and a discharge capacity in a first cycle was recorded. The battery was charged and discharged for 1000 cycles at a current of 0.5 C/1C, and a discharge capacity in a $1000^{th}$ cycle was recorded. The discharge capacity in the $1000^{th}$ cycle was divided by the discharge capacity in the first cycle, and a capacity retention rate in the $1000^{th}$ cycle was obtained.

It can be learned from the above test results that regardless of whether the primer layer was disposed, when the electrode active material layer had a total thickness not greater than 170 μm and a sheet resistance ranging from 0.1 ohm to 10 ohms, the battery could have good cycling performance and good nail penetration safety performance. Especially when the sheet resistance ranged from 0.6 ohm to 0.9 ohm, both the cycling performance and the nail penetration safety performance were excellent.

4.6 Effect of a Binder Content in an Exterior Zone of an Electrode Active Material Layer on Improvement of Electrochemical Performance of a Battery Because a binder content of a primer layer in an interior zone was generally high, there was a strong binding force between the primer layer and a current collector. However, a binding force between an upper electrode active material layer (that is, an exterior zone) and the primer layer (that is, the interior zone) was affected by the binder content of the upper active material layer. The binder content of the upper active material layer (exterior zone) should be preferably higher than a lower limit value, so that in an abnormal case such as nail penetration, the entire electrode active material layer can effectively wrap metal burrs generated in the conductive layer, to improve nail penetration safety performance of the battery.

From a perspective of nail penetration safety of the battery, the following describes a function of the binder content of the upper electrode active material layer in improving electrochemical performance of the battery.

Positive electrode plates were prepared according to the method in the foregoing examples, but composition of upper-layer slurries was adjusted. In this way, a plurality of positive electrode plates with different content of binders in upper positive electrode active material layers were prepared. The specific electrode plate composition is shown in the table below.

TABLE 9

| Electrode plate number | Current collector number | Support layer Material | Support layer D1 | Conductive layer Material | Conductive layer D2 | Primer layer (interior zone) | Upper active material layer (exterior zone) |
|---|---|---|---|---|---|---|---|
| Positive electrode plate 53 | Positive electrode current collector 4 | PET | 10 μm | Al | 1 μm | 65% conductive carbon black, 35% aqueous PVDF, with a thickness of 1.5 μm | NCM811, D50 6.5 μm, an active material layer with a thickness of 55 μm, 0.5 wt % binder PVDF |
| Positive electrode plate 54 | Positive electrode current collector 4 | PET | 10 μm | Al | 1 μm | 65% conductive carbon black, 35% aqueous PVDF, with a thickness of 1.5 μm | NCM811, D50 6.5 μm, an active material layer with a thickness of 55 μm, 1 wt % binder PVDF |
| Positive electrode plate 55 | Positive electrode current collector 4 | PET | 10 μm | Al | 1 μm | 65% conductive carbon black, 35% aqueous PVDF, with a thickness of 1.5 μm | NCM811, D50 6.5 μm, an active material layer with a thickness of 55 μm, 2 wt % binder PVDF |
| Positive electrode plate 56 | Positive electrode current collector 4 | PET | 10 μm | Al | 1 μm | 65% conductive carbon black, 35% aqueous PVDF, with a thickness of 1.5 μm | NCM811, D50 6.5 μm, an active material layer with a thickness of 55 μm, 3 wt % binder PVDF |
| Positive electrode plate 57 | Positive electrode current collector 4 | PET | 10 μm | Al | 1 μm | 65% conductive carbon black, 35% aqueous PVDF, with a thickness of 1.5 μm | NCM811, D50 6.5 μm, an active material layer with a thickness of 55 μm, 5 wt % binder PVDF |

TABLE 10

| Battery number | Electrode plate | | Nail penetration test result |
|---|---|---|---|
| Battery 53 | Positive electrode plate 53 | Conventional negative electrode plate | 1 passed, 9 failed |
| Battery 54 | Positive electrode plate 54 | Conventional negative electrode plate | 6 passed, 4 failed |
| Battery 55 | Positive electrode plate 55 | Conventional negative electrode plate | All passed |
| Battery 56 | Positive electrode plate 56 | Conventional negative electrode plate | All passed |
| Battery 57 | Positive electrode plate 57 | Conventional negative electrode plate | All passed |

Table 10 shows nail penetration test results of the batteries assembled by using the foregoing different positive electrode plates. The results show that the higher binder content of the upper positive electrode active material layer generated, the better nail penetration safety performance of the corresponding battery. Based on the total weight of the upper active material layer, the binder content of the upper positive electrode active material layer was preferably not less than 1 wt %, more preferably, not less than 1.5 wt %, and most preferably, not less than 2 wt %.

A person skilled in the art may understand that the foregoing shows an application example of an electrode plate in this application only by using a lithium battery as an example. However, the electrode plate in this application may also be applied to another type of electrochemical apparatus, and a good technical effect of this application can still be achieved.

According to the disclosure and teaching of this specification, a person skilled in the art of this application may further make appropriate changes or modifications to the foregoing embodiments. Therefore, this application is not limited to the foregoing disclosure and the described embodiments, and some changes or modifications to this application shall also fall within the protection scope of the claims of this application. In addition, although some specific terms are used in this specification, these terms are used only for ease of description, and do not constitute any limitation on this application.

What is claimed is:

1. A positive electrode plate, comprising a current collector and an electrode active material layer disposed on at least one surface of the current collector, wherein the current collector comprises a support layer and a conductive layer disposed on at least one surface of the support layer, a single-sided thickness D2 of the conductive layer along a thickness direction satisfies 30 nm≤D2≤3 μm, a thickness D1 of the support layer satisfies 1 μm≤D1≤30 μm, and the support layer along the thickness direction is made of a polymer material or a polymer composite material;

the electrode active material layer comprises an electrode active material, a binder, and a conductive agent, a total thickness $D_{total}$ of the electrode active material layer is not greater than 170 μm, and a sheet resistance of the electrode active material layer ranges from 0.1 ohm to 10 ohms; and the electrode plate has a length direction, which is a main dimension direction with a larger magnitude, and a width direction, which is a secondary dimension direction with a smaller magnitude, the length direction and the width direction are perpendicular to the thickness direction of the current collector, when viewed in the width direction of a coated surface of the electrode plate, the electrode active material layer comprises 2n+1 zones classified by compacted density, and a compacted density of a middle zone is greater than a compacted density of zones on both sides, wherein n=1, 2, or 3.

2. The positive electrode plate according to claim 1, wherein a binder content of the electrode active material layer is not less than 1 wt %.

3. The positive electrode plate according to claim 1, wherein the binder contained in the electrode active material layer is unevenly distributed in a thickness direction, wherein based on a total weight of the electrode active material layer, a weight percentage of the binder in an interior zone of the electrode active material layer closer to the current collector is greater than a weight percentage of the binder in an exterior zone of the electrode active material layer farther away from the current collector;

based on a total weight of the exterior zone of the electrode active material layer, a weight percentage of the binder in the exterior zone is 1 wt % to 5 wt %; and/or based on a total weight of the interior zone of the electrode active material layer, a weight percentage of the binder in the interior zone is 1 wt % to 90 wt %.

4. The positive electrode plate according to claim 1, wherein the conductive agent in the electrode active material layer is unevenly distributed in a thickness direction, wherein based on a total weight of the electrode active material layer, a weight percentage of the conductive agent in an interior zone of the electrode active material layer closer to the current collector is greater than a weight percentage of the conductive agent in an exterior zone of the electrode active material layer farther away from the current collector;

based on the total weight of the electrode active material layer in the exterior zone, a weight percentage of the conductive agent in the exterior zone is 0.5 wt % to 10 wt %; and based on the total weight of the electrode active material layer in the interior zone, a weight percentage of the conductive agent in the interior zone is 10 wt % to 99 wt %.

5. The positive electrode plate according to claim 1, wherein the conductive layer is a metal conductive layer, and the metal conductive layer is made of at least one of aluminum, nickel, titanium, silver, and aluminum-zirconium alloy; and/or a material of the support layer is selected from at least one of an insulation polymer material, an insulation polymer composite material, a conductive polymer material, and a conductive polymer composite material; wherein the insulation polymer material is selected from at least one of polyamide, polyterephthalate, polyimide, polyethylene, polypropylene, polystyrene, polyvinyl chloride, aramid, polydiformylphenylenediamine, acrylonitrile-butadiene-styrene copolymer, polybutylene terephthalate, poly(p-phenylene terephthalamide), ethylene propylene rubber, polyoxymethylene, epoxy resin, phenolic resin, polytetrafluoroethylene, polyphenyl sulfide, polyvinylidene fluoride, silicone rubber, polycarbonate, cellulose and its derivatives, starch and its derivatives, protein and its derivatives, polyvinyl alcohol and its cross-linked products, and polyethylene glycol and its cross-linked products;

the insulation polymer composite material is selected from a composite material formed of an insulation polymer material and an inorganic material, wherein the inorganic material is at least one of a ceramic material, a glass material, and a ceramic composite material;

the conductive polymer material is selected from a polysulfur nitride polymer material or a doped conjugated polymer material;

the conductive polymer composite material is selected from a composite material formed of an insulation polymer material and a conductive material, wherein the conductive material is selected from at least one of a conductive carbon material, a metal material, and a composite conductive material; the conductive carbon material is selected from at least one of carbon black, carbon nanotube, graphite, acetylene black, and graphene; the metal material is selected from at least one of nickel, iron, copper, aluminum, and alloy of the foregoing metals; and the composite conductive material is selected from at least one of nickel-coated graphite powder, and nickel-coated carbon fiber; and the material of the support layer is an insulation polymer material or an insulation polymer composite material.

6. The positive electrode plate according to claim 1, wherein the thickness D1 of the support layer satisfies 1 μm≤D1≤15 μm; and/or a room-temperature Young's modulus of the support layer satisfies 20 GPa≥E≥4 GPa; and/or there are cracks in the conductive layer; and/or an average particle size D50 of the electrode active material is 5 μm to 15 μm; and/or the single-sided thickness D2 of the conductive layer satisfies 300 nm≤D2≤2 μm.

7. The positive electrode plate according to claim 1, wherein a protection layer is further disposed on a surface of the conductive layer, and the protection layer is disposed only on one surface of the conductive layer of the current collector or disposed on two surfaces of the conductive layer of the current collector; and a thickness D3 of the protection layer satisfies D3≤D2/10 and 1 nm≤D3≤200 nm.

8. The positive electrode plate according to claim 1, wherein the conductive agent is made of at least one of a conductive carbon material and a metal material, wherein the conductive carbon material is selected from at least one of the following: acetylene black or conductive carbon black, a carbon nanotube, conductive graphite or graphene, and reduced graphene oxide; and the metal material is selected from at least one of aluminum powder, iron powder, and silver powder;

the conductive agent contains a carbon nanotube; and the binder is selected from at least one of styrene butadiene rubber, oily polyvinylidene fluoride (PVDF), polyvinylidene fluoride copolymer, sodium carboxy methyl cellulose, polystyrene, polyacrylic acid, polytetrafluoroethylene, polyacrylonitrile, polyimide, aqueous PVDF, polyurethane, polyvinyl alcohol, polyacrylate, polyacrylic acid-polyacrylonitrile copolymer, and polyacrylate-polyacrylonitrile copolymer.

9. An electrochemical apparatus, comprising a positive electrode plate, a negative electrode plate, a separator, and an electrolyte, wherein the positive electrode plate is the positive electrode plate according to claim 1.

10. An apparatus, comprising the electrochemical apparatus according to claim 9.

11. The positive electrode plate according to claim 1, wherein the compacted density of the middle zone is greater than the compacted density of zones on both sides by 5% to 30% of the compacted density of the middle zone.

12. The positive electrode plate according to claim 1, wherein a ratio of a width of the middle zone to a sum of a width of each one of the zones is 20% to 80%.

13. The electrode plate according to claim 12, wherein the ratio of the width of the middle zone to the sum of the width of each one of the zones is 30% to 70%.

14. The electrode plate according to claim 13, wherein the ratio of the width of the middle zone to the sum of the width of each one of the zones is 45% to 60%.

15. The electrode plate according to claim 14, wherein the ratio of the width of the middle zone to the sum of the width of each one of the zones is 45% to 55%.

16. The electrode plate according to claim 11, wherein the compacted density of the middle zone is greater than the compacted density of zones on both sides by 8% to 20% of the compacted density of the middle zone.

17. The electrode plate according to claim 1, wherein the compacted density of the middle zone is the highest among all of the 2n+1 zones, and the compacted density of the zones on both sides gradually decreases from middle to edge along the width direction of the electrode plate.

18. The electrode plate according to claim 17, wherein two symmetrical zones of the zones on both sides have the same compacted density.

19. The electrode plate according to claim 1, wherein n=1, and the electrode active material layer comprises 3 zones.

20. The electrode plate according to claim 1, wherein n=2, and the electrode active material layer comprises 5 zones.

\* \* \* \* \*